United States Patent
Kobayashi

(10) Patent No.: US 8,036,281 B2
(45) Date of Patent: Oct. 11, 2011

(54) IMAGE CODING APPARATUS AND IMAGE CODING METHOD

(75) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1510 days.

(21) Appl. No.: 11/420,060

(22) Filed: May 24, 2006

(65) Prior Publication Data

US 2006/0274159 A1 Dec. 7, 2006

(30) Foreign Application Priority Data

Jun. 1, 2005 (JP) ................. 2005-161847
Dec. 5, 2005 (JP) ................. 2005-351054

(51) Int. Cl.
*H04N 7/18* (2006.01)
(52) U.S. Cl. .................. 375/240.26
(58) Field of Classification Search . 375/240.01–240.29
See application file for complete search history.

(56) References Cited

U.S. PATENT DOCUMENTS

| | | | |
|---|---|---|---|
| 6,205,286 B1 | 3/2001 | Nishimura et al. | |
| 7,586,517 B2 * | 9/2009 | Iguchi et al. | 348/207.1 |
| 2004/0028132 A1 | 2/2004 | Kadono | |

FOREIGN PATENT DOCUMENTS

| | | |
|---|---|---|
| JP | 07-107466 A | 4/1995 |
| JP | 2004-080658 A | 3/2004 |
| JP | 2004-180345 A | 6/2004 |
| JP | 2003-199112 A | 5/2006 |

* cited by examiner

*Primary Examiner* — Andy Rao
(74) *Attorney, Agent, or Firm* — Canon USA Inc. IP Division

(57) ABSTRACT

There is provided an image coding apparatus for outputting an image stream in which random access and easy editing are possible without reducing encoding efficiency. The image coding apparatus sets, in the image stream, a picture in which the random access is possible based on camera control data or correlation between the images.

22 Claims, 17 Drawing Sheets

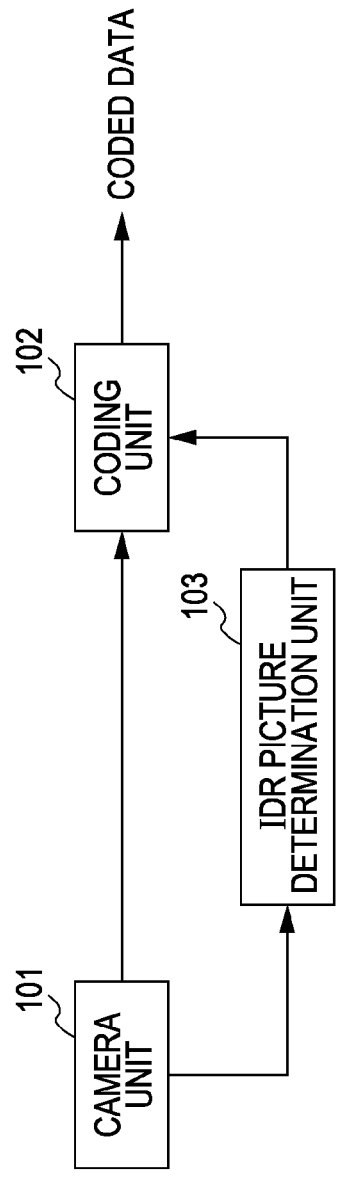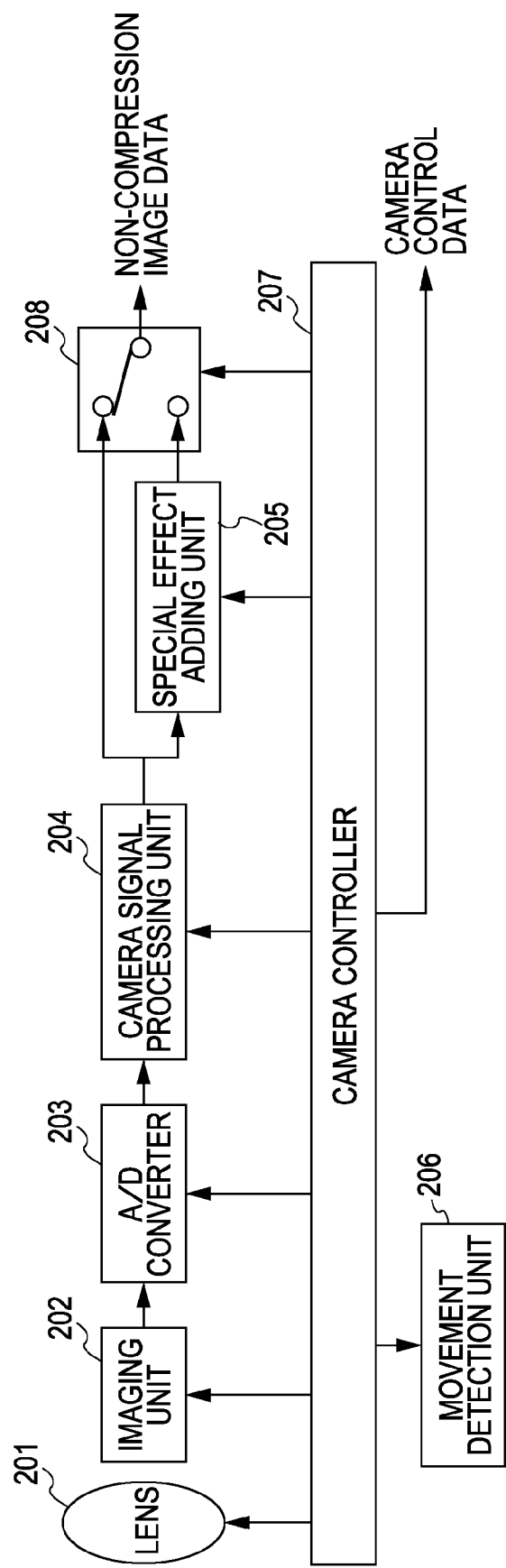

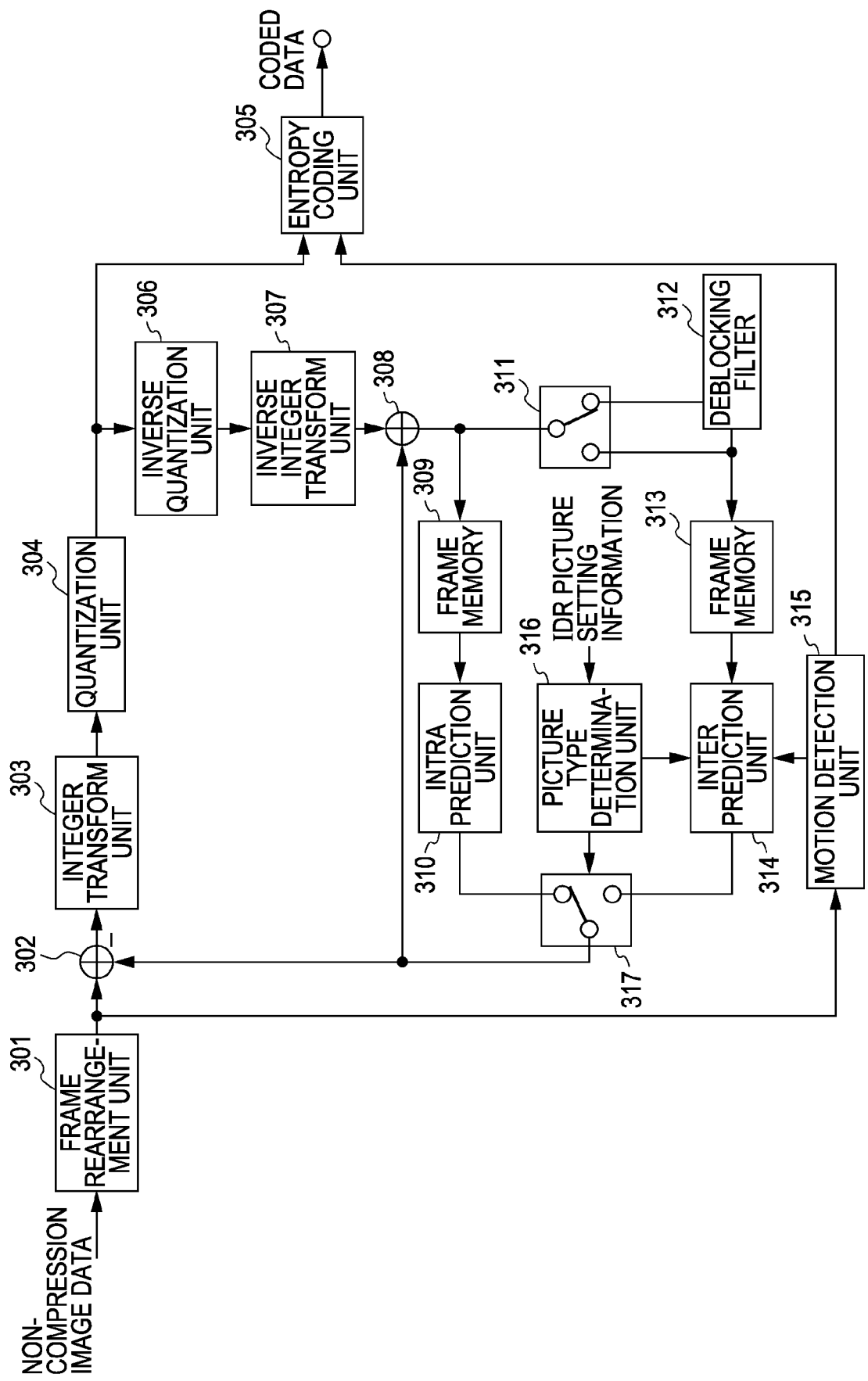

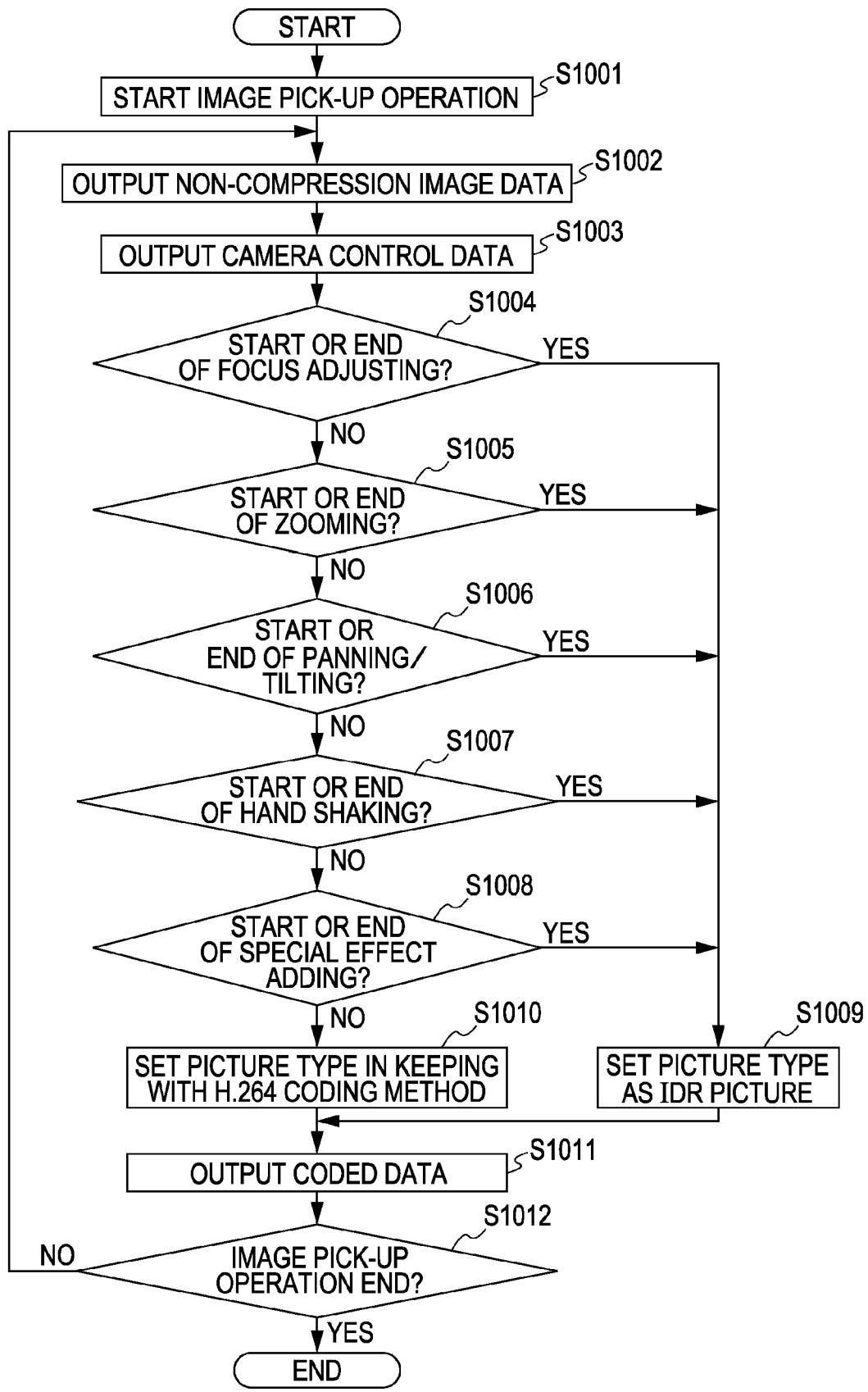

FIG. 11A
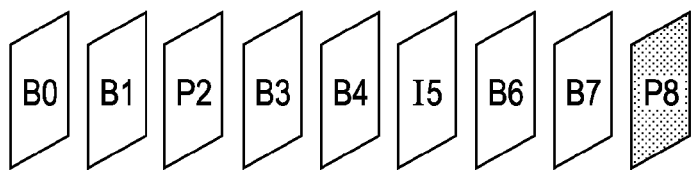
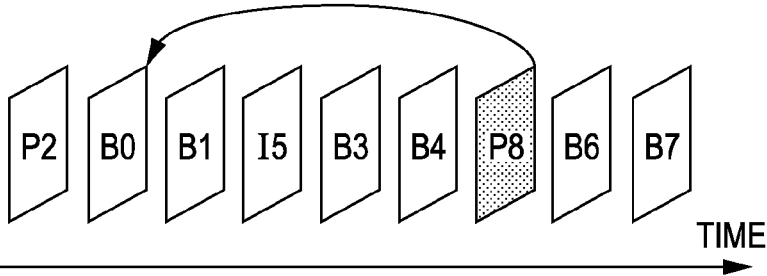
FIG. 11B
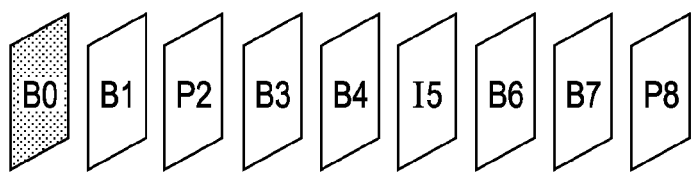
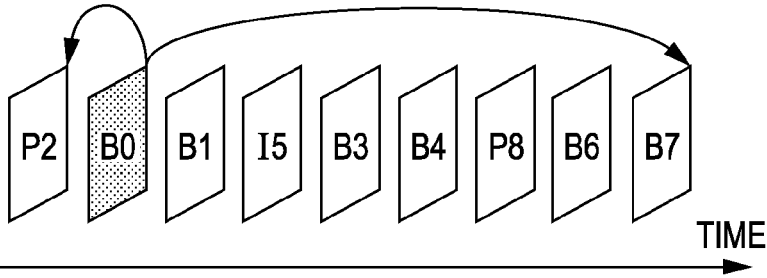
FIG. 11C
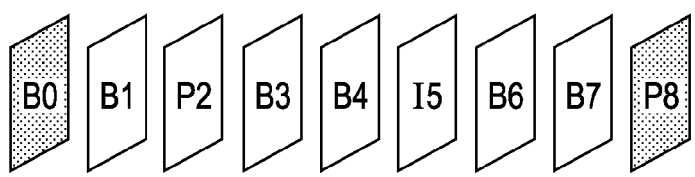
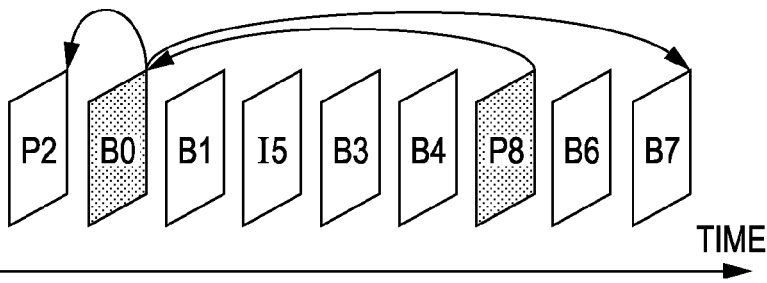

IMAGE CODING APPARATUS AND IMAGE CODING METHOD

BACKGROUND OF THE INVENTION

1. Field of the Invention

The present invention relates to an image coding apparatus and a method thereof for compression-coding image data by using an inter-picture predictive coding.

2. Description of the Related Art

As a technology for high efficiency coding a moving image, coding methods, such as JPEG (Joint Photographic Experts Group) and MPEG (Moving Picture Experts Group)-1 and MPEG-2 by using a technology of motion prediction and compensation have become commercially practical. Various manufacturers are developing and commercially producing DVD (digital versatile disk) recorders or imaging apparatuses such as digital cameras or digital video cameras, which make the video data recordable by using the coding methods. A user can simply view and listen to the moving images using these apparatuses or personal computers, DVD players, etc.

The amount of data of digitized moving image turns into a huge amount. Therefore, a coding method of the moving image which can produce further high compression rather than the above-described MPEG-1 or MPEG-2 etc. is desired. Recently, a coding method called H.264/MPEG-4 part 10 (hereinafter, referred to as "H.264") has been standardized by ITU-T (International Telecommunication Union-Telecommunication Standardization Sector) and ISO (International Organization for Standardization).

Here, in H.264, selection of a reference image used for the inter-picture (frame) prediction is explained with reference to FIGS. 11 and 12. FIGS. 11A to 11C and FIGS. 12A to 12C illustrate input image stream and picture type of each picture that comprises the input image stream. As the picture types in H.264, there are I pictures encoded without reference to other pictures, P pictures encoded using motion prediction from a past coded picture and used as a reference, and B pictures encoded using past and/or future pictures for motion prediction. In FIGS. 11 and 12, the upper part illustrates an image stream in the display order, and the lower part illustrates an image stream in the coding order. For example, in FIG. 11A, the P8 picture indicates that the P8 picture is displayed ninth. The arrow in the figure indicates a relationship of a reference picture, when coding. For example, in FIG. 11A, it is indicated that the P8 picture is referring to the B0 picture, and in FIG. 11B, it is indicated that the B0 picture is referring to the P2 and B7 pictures.

In MPEG-2 inter-picture prediction coding, the P picture of a coding object can only refer to an I picture or a P picture immediately before the P picture of the coding object, and the B picture of a coding object can only refer to an I picture or a P picture immediately before or after the B picture of the coding object. On the other hand, in H.264 inter-picture prediction coding, the picture of a coding object can refer to an arbitrary picture (however, a P picture is encoded only by forward prediction) and an arbitrary picture type in the image stream. For example, as shown in FIG. 11A, the P8 picture can refer to the B0 picture which precedes the I5 picture. As shown in FIG. 11B, the B0 picture can refer to the B7 picture which follows the I5 picture. Thus, since H.264 can select the reference image flexibly as compared with MPEG-2, the inter-picture prediction precision and coding efficiency of H.264 are superior to those of MPEG-2.

On the other hand, since H.264 permits the above flexible references, there is a possibility that it may become impossible to carry out random access arbitrarily. For example, in FIG. 1C, the case where the image stream is reproduced by the random access from the I5 picture which is a picture (frame) at a midpoint of the image stream is described below. When the P8 picture is decoded after starting reproduction from the I5 picture in the image stream, since the P8 picture is referring to the B0 picture when coding, the P8 picture needs the decoded image of the B0 picture when decoding. However, since reproduction is started from the I5 picture, the decoded image of the B0 picture cannot be obtained. Even if it is possible to decode the B0 picture beforehand, in that case, since the B0 picture is referring to the P2 and B7 pictures, it is necessary to also decode the P2 and the B7 pictures beforehand. Similarly, although not shown in the figure, since the P2 and the B7 pictures are also referring to other pictures, it is necessary to also decode other pictures beforehand. Thus, since the picture obtained by jumping over the I5 picture is permitted as the reference picture, even if it is a case where reproduction is started from the I5 picture, it is necessary to decode data of the picture preceding the I5 picture and it is difficult to start decoding promptly from the I5 picture.

Therefore, in order to solve such a problem in H.264 and to make random access possible, the method of setting restriction regarding the reference relationship of the image in the motion prediction for the I picture periodically is disclosed in Japanese Laid-open No. 2003-199112, for example. The conditional I picture is called an IDR (Instantaneous Decoder Refresh) picture in H.264.

Here, the IDR picture is described below with reference to FIGS. 12A-12C. The image streams indicated in FIGS. 12A and 12B are an example when setting the I5 picture as the IDR picture for the same streams as FIGS. 11A and 11B. In cases where the I5 picture is set as the IDR picture, when encoding the IDR picture, a frame memory which records the reference image is cleared. Therefore, the picture to be encoded following the IDR picture cannot refer to a picture which has been encoded preceding the IDR picture as shown in FIG. 12A. Similarly, the picture to be encoded preceding the IDR picture cannot refer to a picture which has been encoded following the IDR picture as shown in FIG. 12B. That is, the picture to be encoded preceding the IDR picture cannot refer to the picture which is encoded following the IDR picture, and the picture to be encoded following the IDR picture cannot refer to pictures which have been encoded preceding the IDR picture as shown in FIG. 12C.

By the above-described processing, since it will become unnecessary to decode the image data preceding the IDR picture if reproduction is started from the IDR picture, random access and smooth reproduction are realizable. Furthermore, since the reference of the picture obtained by jumping over the IDR picture is prohibited, the editing on the basis of the IDR picture is easily enabled.

In the above-described H.264, the random access reproduction can be quickly carried out by using the IDR picture which restricts the reference relationship for inter picture prediction. However, in order to carry out random access from arbitrary midpoints of the image stream, many IDR pictures must be set. Since the reference relation of the image is restricted by setting the IDR picture, the encoding efficiency falls with the increase of the number of the IDR picture.

Additionally, since the code amount of the IDR picture to be intra-picture coded is large, the IDR picture itself is considered to become a factor which reduces the encoding efficiency.

That is, if the encoding efficiency is taken into consideration, it will be desirable to hold down the setting of the IDR picture to a necessary minimum. In the example which sets the IDR picture periodically, since a picture unnecessary for the random access is also set as the IDR picture, the encoding efficiency has the problem of getting worse.

SUMMARY OF THE INVENTION

In view of the above problems in the conventional art, the present invention provides an image coding apparatus and a method which can output the image stream in which the random access and easy editing are possible, without reducing the encoding efficiency.

According to an aspect of the present invention, an image coding apparatus for performing a coding process by using inter-picture prediction includes: a camera unit arranged to pick-up an object image and to output image data; a determination unit arranged to determine whether random access for a picture is possible based on operation information of the camera unit; and a coding unit arranged to encode the image data output by the camera unit into coded data, the image data being encoded so that random access is possible in cases where the determination unit determines that random access is possible for the picture.

According to another aspect of the present invention, an image coding apparatus for performing a coding process by using inter-picture prediction includes: a determination unit arranged to obtain camera control data relating to operation of a camera unit which picks up an object image, and to determine whether reference of a picture from the object image obtained by jumping over a predetermined picture is prohibited based on the camera control data; and a coding unit arranged to encode object image data input from the camera unit, the object image data being encoded prohibiting reference of the picture obtained by jumping over the predetermined picture when the determination unit determines that reference of the picture obtained by jumping over the predetermined picture is prohibited.

According to another aspect of the present invention, an image coding apparatus for performing a coding process by using inter-picture prediction includes: a determination unit arranged to obtain camera control data relating to operation of a camera unit which picks-up an object, and to determine whether a conditional picture which provides restrictions for other pictures in motion reference relationship is set based on the camera control data; and a coding unit arranged to encode image data input from the camera unit and to generate a conditional picture when the determination unit determines that the conditional picture is set.

According to yet another aspect of the present invention, an image coding apparatus for performing a coding process by using inter-picture prediction includes: a determination unit arranged to determine whether there is a correlation between pictures of input image data obtained from a camera unit which picks up an object, and to determine whether a conditional picture which provides restriction for other pictures in motion reference relationship is set based on the determination result; and a coding unit arranged to encode image data input from the camera unit which picks-up an object and to generate the conditional picture the determination unit determines that the conditional picture is set.

According to still another aspect of the present invention, an image coding method for performing a coding process by using inter-picture prediction includes: picking-up an object image via a camera unit; obtaining image data based on the object image picked-up; determining whether random access to a picture is possible based on control information obtained from the camera unit; and encoding the image data to generate coded data such that the encoded data includes a picture in which random access is possible when it is determined that random access is possible based on the control information obtained from the camera unit.

According to still another aspect of the present invention, an image coding method for performing a coding process by using inter-picture prediction includes: obtaining image data from a camera unit; obtaining camera control data relating to operation of the camera unit; determining whether reference of a picture obtained by jumping over a predetermined picture is prohibited based on the camera control data; encoding the image data obtained from the camera unit, the image data being encoded prohibiting reference of the picture obtained by jumping over the predetermined picture when the it is determined that reference of the picture obtained by jumping over the predetermined picture is prohibited.

According to yet another aspect of the present invention, an image coding method for performing a coding process by using inter-picture prediction includes: obtaining image data from a camera unit; obtaining camera control data relating to operation of the camera unit; determining whether a conditional picture which provides restrictions for other pictures in motion reference relationship is set based on the camera control data; and encoding the image data obtained from a camera unit such that a conditional picture is generated when it is determined that the conditional picture is set.

According to still another aspect of the present invention, an image coding method for performing a coding process by using inter-picture prediction includes: obtaining image data input from a camera unit; determining whether there is a correlation between pictures of the input image data; determining whether a conditional picture which provides restriction for other pictures in motion reference relationship is set based on there is a correlation between pictures of the input image data; and encoding the input image data such that a conditional picture is generated when it is determined that the conditional picture is set.

Further features of the present invention will become apparent from the following description of exemplary embodiments (with reference to the attached drawings).

BRIEF DESCRIPTION OF THE DRAWINGS

FIG. 1 is an exemplary block diagram illustrating an exemplary arrangement of an image processing apparatus in a first embodiment of the present invention.

FIG. 2 is an exemplary block diagram illustrating an exemplary arrangement of a camera unit.

FIG. 3 is an exemplary block diagram illustrating an exemplary arrangement of a coding unit.

FIG. 10 is a flowchart illustrating exemplary setting process procedures of an IDR picture in a first embodiment.

FIGS. 11A, 11B, and 11C illustrate input image stream and picture type of each picture which comprises an exemplary input image stream.

DESCRIPTION OF THE EMBODIMENTS

Figure 4:
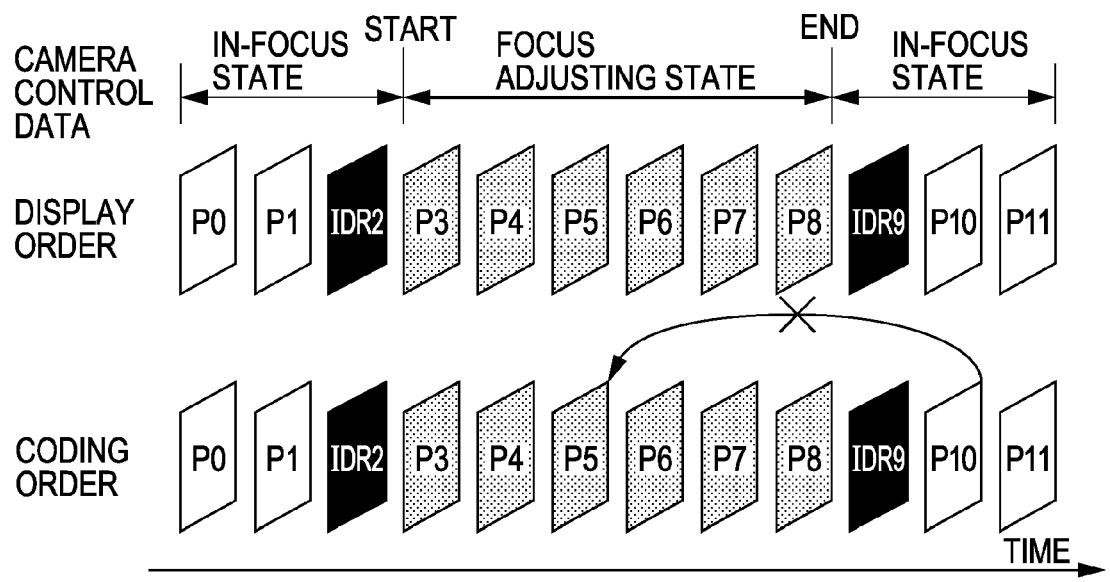
FIGS. 4 and 5 illustrate an exemplary setting process of an IDR picture according to camera control data which indicates a focus adjusting state.

Exemplary embodiments of the invention are described in detail below with reference to the accompanying drawings. The relative layout of constituent elements exemplified in the embodiments should appropriately be changed in accordance with the arrangement and conditions of the apparatus to which the present invention is applied. The present invention is not limited to these illustrative embodiments.

First Exemplary Embodiment

FIG. 1 is an exemplary block diagram of the image processing apparatus in the first embodiment of the present invention. The image processing apparatus in this embodiment can set a picture type as the IDR picture according to camera control data, and includes a camera unit 101, a coding unit 102 and an IDR picture determination unit 103.

The camera unit 101 picks-up an object image to output image data. The coding unit 102 compression-codes the image data output from the camera unit 101. The IDR picture determination unit 103 determines whether the picture type is made into the IDR picture according to the camera control data from the camera unit 101. The IDR picture determination unit 103 provides the determination result to the coding unit 102.

Next, the camera unit 101, the coding unit 102, and the IDR picture determination unit 103 are described below in detail.

First, an exemplary arrangement of the camera unit 101 is described below with reference to FIG. 2.

FIG. 2 is an exemplary block diagram illustrating an exemplary arrangement of the camera unit 101. As shown in FIG. 2, the camera unit 101 includes a lens 201, an imaging unit 202, an A/D (analog-to-digital) converter 203, a camera signal processing unit 204, a special effect adding unit 205, a movement detection unit 206, a camera controller 207 and a selection unit 208. The camera unit 101 picks-up an object image, and outputs non-compression image data corresponding to the picked-up object image and camera control data.

Operation of the camera unit 101 is described below.

First, the lens 201 introduces object light into the imaging unit 202. The lens 201 carries out a zooming operation, a focus adjusting operation etc. corresponding to a control signal output from the below-described camera controller 207. The imaging unit 202 images the object by using a CCD (charge coupled device), CMOS (complementary metal oxide semiconductor), etc. and converts the object image into an electrical signal to output to the A/D converter 203. The A/D converter 203 converts an analog signal into a digital signal.

The camera signal processing unit 204 carries out γ correction, a white balance control, etc., and outputs non-compression image data.

Here, in cases where a special effect, such as fade, wipe, etc., is added for the non-compression image data output by the camera signal processing unit 204, the non-compression image data to which the special effect is added by the special effect adding unit 205 is output. On the other hand, in cases where there is not a special effect to be added for the non-compression image data, the non-compression image data output by the camera signal processing unit 204 is output directly.

The selection unit 208 selects and outputs the non-compression image data with the special effect output by the special effect adding unit 205 or the non-compression image data without the special effect output directly by the camera signal processing unit 204. The movement detection unit 206 detects a shaking in the hands of an operation (hereinafter, referred to as "hand shaking") and panning/tilting operations by detecting movement of the camera unit 101, for example with the application of a well-known method which uses a gyro sensor etc. As another detecting method, for example, by evaluating the difference between a specific picture (frame) and a picture (frame) immediately before the specific picture by the camera signal processing unit 204, the detection of the hand shaking and the panning/tilting operations can be performed.

The camera controller 207 controls the camera unit 101 and outputs camera control data. The camera control data includes the control data of a module which includes above-described camera unit 101.

An exemplary arrangement of the coding unit 102 is described below with reference to FIG. 3.

FIG. 3 is an exemplary block diagram illustrating an exemplary arrangement of the coding unit 102. As shown in FIG. 3, the coding unit 102 includes a frame rearrangement unit 301, a subtractor 302, an integer transform unit 303, a quantization unit 304, an entropy coding unit 305, an inverse quantization unit 306, an inverse integer transform unit 307, an adder 308, frame memories 309 and 313, an intra prediction unit 310, selection units 311 and 317, a deblocking filter 312, an inter prediction unit 314, a motion detection unit 315, and a picture type determination unit 316. The coding unit 102 generates block data by dividing the input non-compression image data, and encodes the input non-compression image block data to output coded data by the entropy coding unit 305.

The coding process of the coding unit 102 is described below.

First, the frame rearrangement unit 301 rearranges the non-compression image data, which is input in the coding order. The subtractor 302 subtracts predicted image data from the input image data and outputs difference data. The generating method of the predicted image data is described later.

The integer transform unit 303 performs orthogonal transform for the difference data output from the subtractor 302, and outputs transform coefficients. The quantization unit 304 quantizes the transform coefficients using a predetermined quantization parameter. The entropy coding unit 305 entropy-encodes the transform coefficients quantized by the quantization unit 304 and motion vector information (described later) relating to the inter prediction, and outputs the coded data.

The transform coefficients quantized by the quantization unit 304 are also used for generation of the predicted image data. The inverse quantization unit 306 reverse-quantizes the transform coefficients quantized by the quantization unit 304. The inverse integer transform unit 307 performs reverse integer transform for the transform coefficients inverse-quantized by the inverse quantization unit 306, and outputs decoded difference data. An adder 308 adds the decoded difference data and the predicted image data and outputs local decoded image data.

The local decoded image data is recorded in the frame memory 309. The local decoded image data is also alternatively processed by the deblocking filter 312.

The selection unit 311 selects whether the deblocking filter process is performed for the local decoded image data. The frame memory 313 stores the local decoded image data output from the deblocking filter 312 and the local decoded image data output from the selection unit 311. The data which may be referred to as the predicted image data in subsequent coding process in the local decoded image data is stored in the frame memory 309 or the frame memory 313. The deblocking filter 312 is used in order to remove noise.

The intra prediction unit 310 performs intra-picture prediction processing using the local decoded image data stored in the frame memory 309, and generates the predicted image data. The inter prediction unit 314, using the local decoded image data stored in the frame memory 313, performs inter-picture prediction processing based on the motion vector information detected by the motion detection unit 315, and generates the predicted image data. The motion detection unit 315 detects the motion vector for the input image data, and outputs the detected motion vector information to the inter prediction unit 314 and the entropy coding unit 305.

In cases where the IDR picture determination unit 103 (described later) determines the picture of the coding object as the IDR picture, the picture type determination unit 316 determines the picture type of the picture of the coding object as the IDR picture. On other hand, in cases where the IDR picture determination unit 103 does not determine the picture of the coding object as the IDR picture, the picture type determination unit 316 determines the picture type of the picture of coding frame in keeping with the H.264 coding method, without using the IDR picture. That is, the picture type of the coding object is determined as the picture type (e.g., I picture, P picture, B picture) other than the IDR picture.

The selection unit 317 selects which predicted image data shall be used between the intra prediction and the inter prediction, i.e., the selection unit 317 selects one of the output from the intra prediction unit 310, and the output from the inter prediction unit 314 according to the picture type determined by the picture type determination unit 316. The selection unit 317 outputs the selected predicted image data to the subtractor 302 and to the adder 308.

In cases where the picture of the coding object is determined to be the IDR picture, the picture type determination unit 316 may determine the picture type of the picture of the coding object as the I picture, and add a jumping reference prohibit flag to the picture of the coding object. Then, the inter prediction unit 314 may be controlled not to select picture jumping (preceding/following) the I picture as the reference image.

Next, determination process of the IDR picture determination unit 103 is described below with reference to FIGS. 4 to 9.

FIGS. 4 to 9 illustrate an input image sequence, its picture type, and the camera control data. In each figure, the upper part illustrates each picture in the display order (displaying sequentially from a left frame), and the lower part illustrates each picture in the coding order (encoding sequentially from a left frame).

For example, in FIG. 4, P10 picture indicates the P picture displayed eleventh. The camera control data illustrated in FIGS. 4 and 5 indicates focus adjusting control data.

In the display order of FIG. 4, the camera unit 101 is in an in-focus state between P0 picture and IDR2 picture, and between IDR9 picture and P11 picture, and outputs sharply focused image data. Since the camera unit 101 started the focus adjusting process at the time of P3 picture and ended the focus adjustment process at the time of P8 picture, the camera unit 101 is in a focus adjusting state (an out-of-focus state) between the P3 picture and the P8 picture, and outputs out-of-focused image data.

Figure 5:
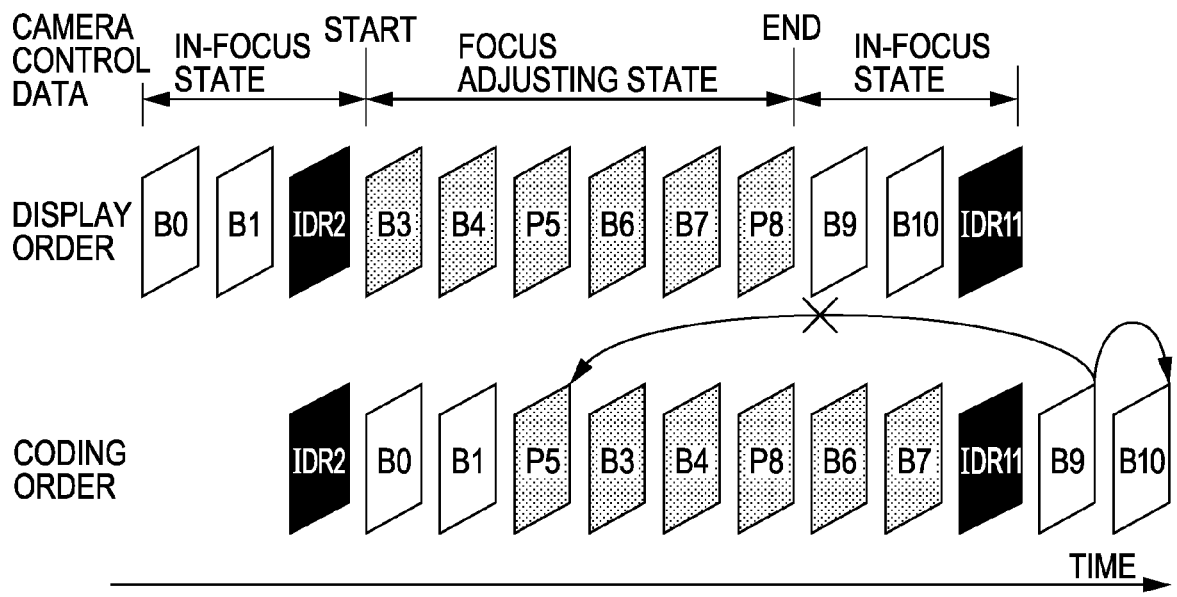

In the display order of FIG. 5, the camera unit 101 is in an in-focus state between B0 picture and IDR2 picture, and between B9 picture and IDR11 picture, and outputs sharply focused image data. Since the camera unit 101 started the focus adjusting process at the time of B3 picture and ended the focus adjusting process at the time of P8 picture, the camera unit 101 is in an out-of-focus state (focus adjusting state) between the B3 picture and the P8 picture, and outputs out-of-focused image data.

The IDR picture determination unit 103 inputs the camera control data output from the camera unit 101, and analyzes the operation of the camera unit 101. Then, the picture type of each frame before a start of operation of the following (1) to (5) and/or after an end of that is determined as the IDR picture, and the IDR picture setting information is output to the coding unit 102:

(1) focus adjusting;
(2) zooming;
(3) panning/tilting;
(4) hand shaking (vibration);
(5) special effect adding.

That is, the camera control data includes focus control data, zooming control data, vibration detection data which indicates a vibration of the camera unit, movement detection data which indicates having detected a movement (e.g., panning, tilting etc.) of the camera unit, and special effect adding data which indicates having added a special effect to the image data.

Here, in the case of (1), operation which determines the picture type as the IDR picture according to the camera control data is described below with reference to FIG. 4 and FIG. 5. In the image sequence which does not include the B picture as shown in FIG. 4, the camera unit 101 is performing the focus adjusting process between the P3 picture and the P8 picture. Therefore, the IDR picture determination unit 103 determines, as the IDR picture (IDR2 picture in FIG. 4), the picture type of the picture immediately before the start of the focus adjusting. Additionally, the IDR picture determination unit 103 determines, as the IDR picture (IDR9 picture in FIG. 4), the picture type of the picture immediately after the end of the focus adjusting. In the image sequence which includes the B picture, which can be encoded using difference with a backward picture, as shown in FIG. 5, the camera unit 101 is performing the focus adjusting process between the B3 and the P8 pictures. Therefore, the IDR picture determination unit 103 determines, as the IDR picture (IDR2 picture in FIG. 5), the picture type of the picture immediately before the start of the focus adjusting operation. Also, the IDR picture determination unit 103 determines, as the IDR picture (IDR11 picture in FIG. 5), the picture type of the picture immediately after B picture(s) (B10 picture in FIG. 5) after the end of the focus adjusting operation.

In cases where the IDR picture is set as shown in FIGS. 4 and 5, for example, the reproduction can be started from the IDR picture (IDR9 picture in FIG. 4, IDR11 picture in FIG. 5) immediately after in-focusing. Since the picture type of the pictures before and after blurred image sequence under the focus adjusting process is set as the IDR picture, the editing for removing the blurred image can be performed easily.

Since the reference image is blurring even if the in-focused image (e.g., P10 picture in FIG. 4, B9 picture in FIG. 5) refers to the out-of-focused image (e.g., P5 picture in FIGS. 4 and 5), precision of the inter-picture prediction falls. Therefore, by setting the pictures before and after the focus adjusting process as the IDR picture, the in-focused image is prohibited from referring to the out-of-focused image. That is, since the in-focused image uses only another in-focused image as the reference image, the precision of the inter-picture prediction and coding efficiency can be improved.

Figure 6:
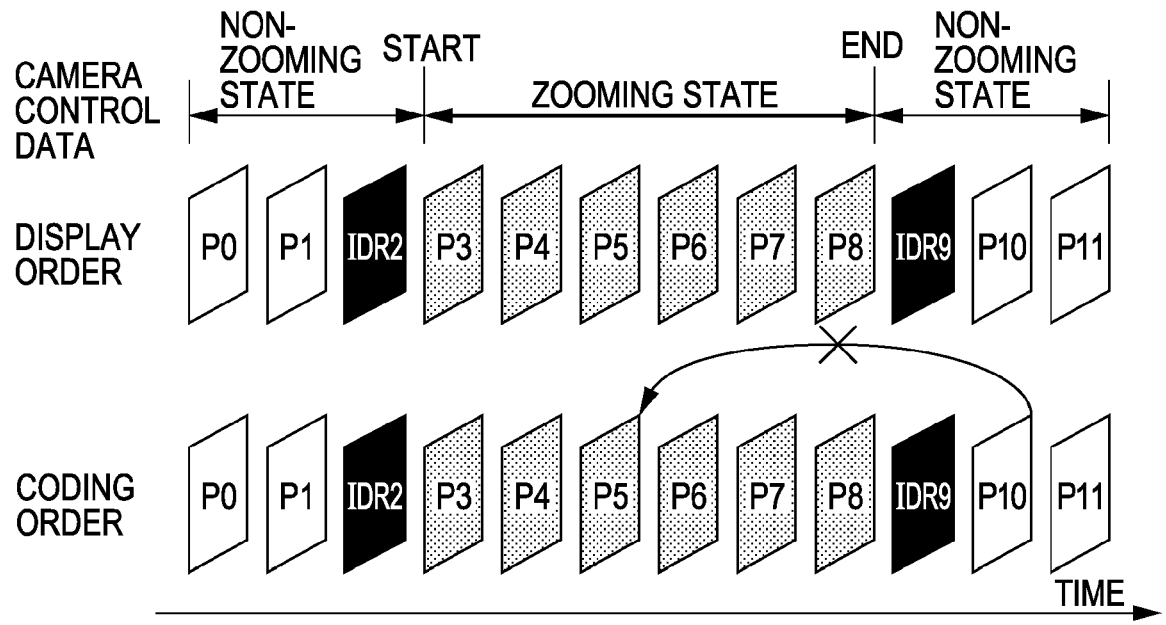
FIG. 6 illustrates an exemplary setting process of an IDR picture according to camera control data which indicates a zooming state.
Figure 7:
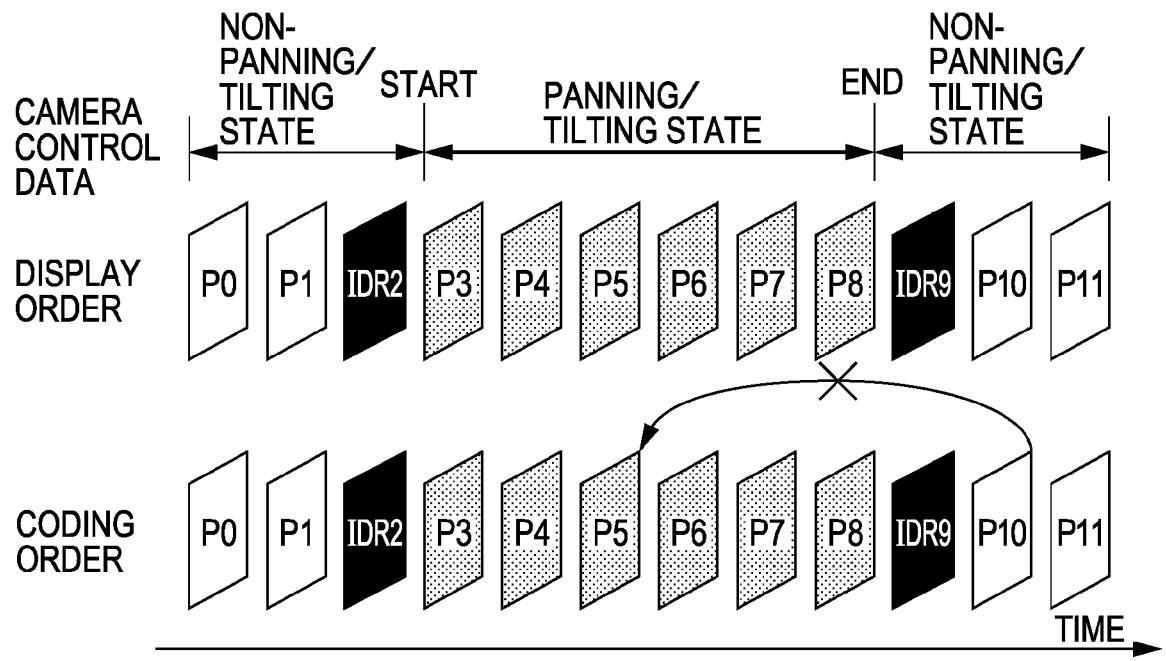
FIG. 7 illustrates an exemplary setting process of an IDR picture according to camera control data which indicates a panning/tilting state.
Figure 8:
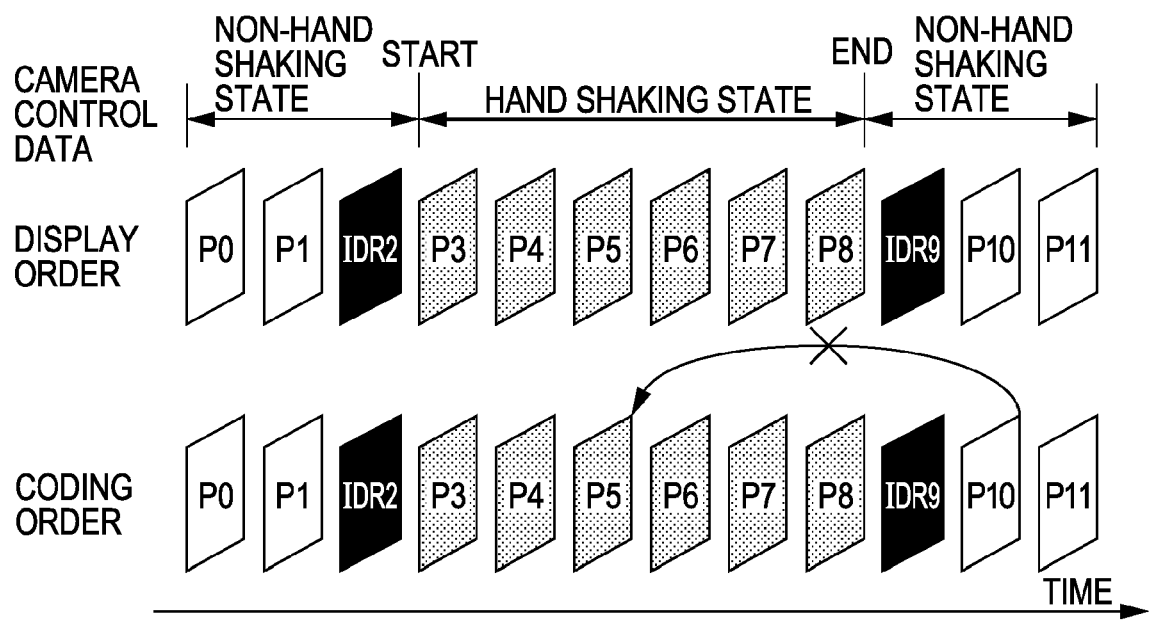
FIG. 8 illustrates an exemplary setting process of an IDR picture according to camera control data which indicates a hand shaking state.
Figure 9:
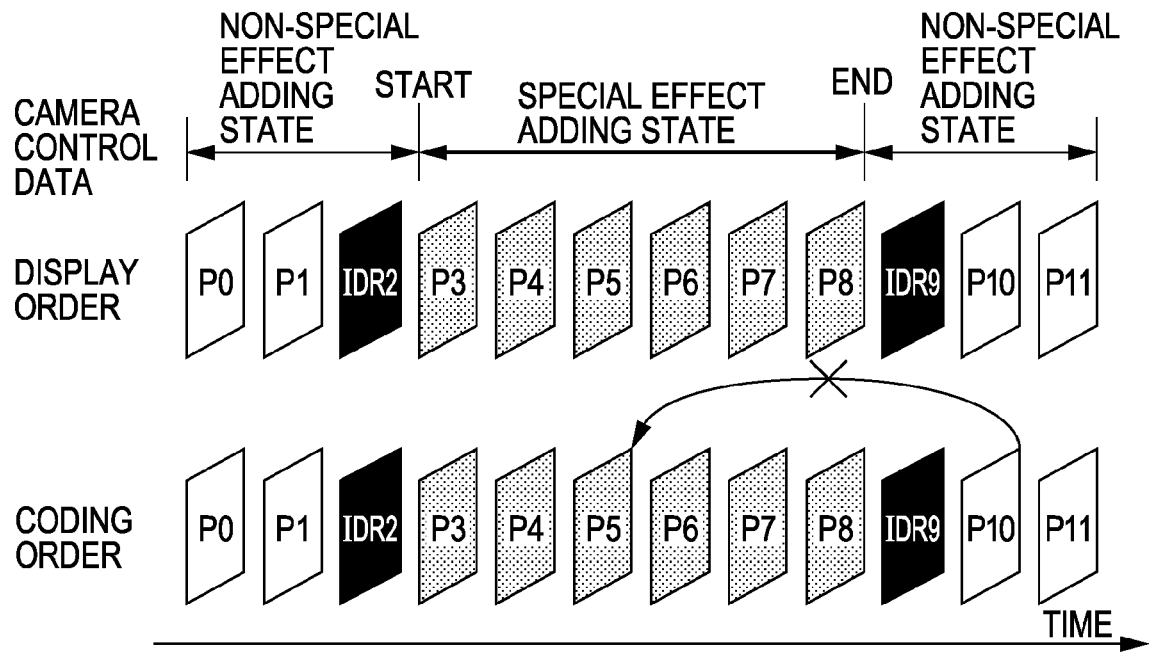
FIG. 9 illustrates an exemplary setting process of an IDR picture according to camera control data which indicates a special effect adding state.
Figure 12A:
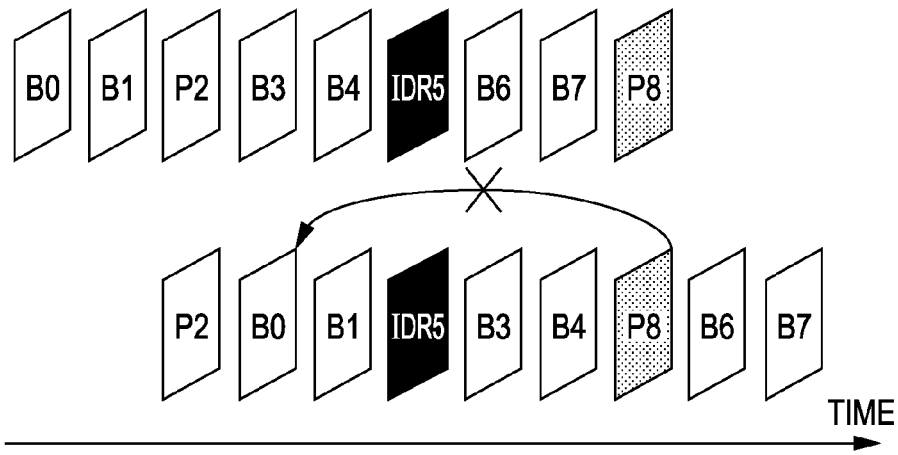
FIGS. 12A, 12B, and 12C illustrate input image stream and picture type of each picture which comprises an exemplary input image stream.
Figure 12B:
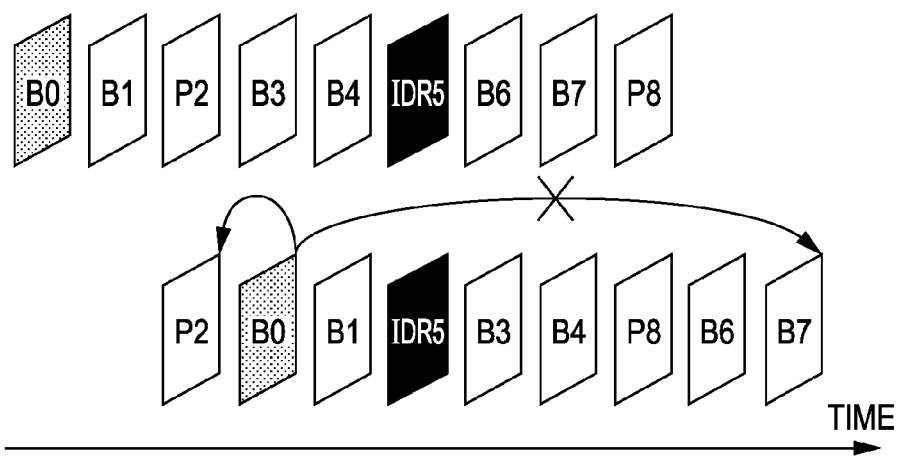
Figure 12C:
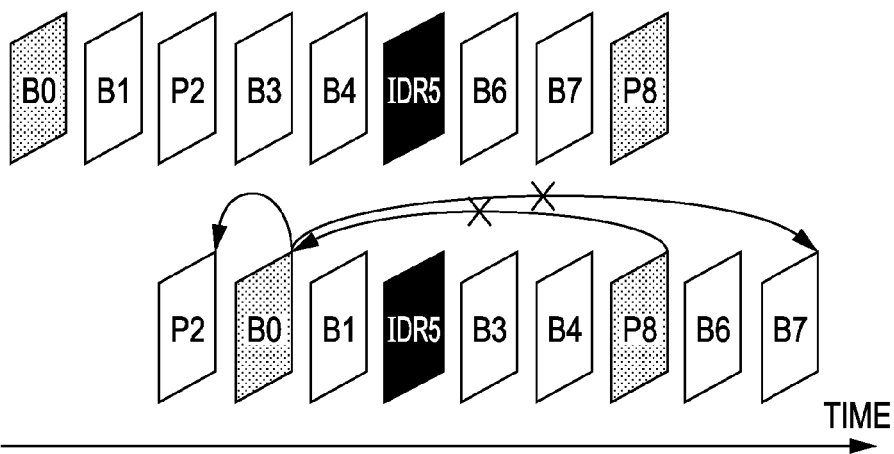

In the case of (2) zooming as well as the case of the above-described (1) focus adjusting, as shown in FIG. 6, the picture type of the pictures before a start of the zooming and after an end of that is set as the IDR picture. In the case of (3) panning/tilting, as shown in FIG. 7, the picture type of the pictures before a start of the panning/tilting and after an end of that is set as the IDR picture. In the case of (4) hand shaking, as shown in FIG. 8, the picture type of the pictures before a start of the hand shaking and after an end of that is set as the IDR picture. In the case of (5) special effect adding, as shown in FIG. 9, the picture type of the pictures before a start of the special effect adding and after an end of that is set as the IDR picture.

In cases where zooming speed or panning/tilting speed is slower than a predetermined threshold, since a user may be carrying out a slow operation intentionally, the picture type of the pictures before the start of the zooming, panning/tilting operation and/or after the end of that may be made not to be determined as the IDR picture.

Next, the process which sets the IDR picture according to the above-described camera control data is described with reference to the flowchart illustrated in FIG. 10.

First, in step S1001, image pick-up operation is started in the camera unit 101. Next, in step S1002, the camera unit 101 outputs the non-compression image data to the coding unit 102. In step S1003, the camera unit 101 outputs the camera control data to the IDR picture determination unit 103.

Next, in step 1004, the IDR picture determination unit 103 determines whether the camera control data indicates the start or the end of focus adjusting. If the camera control data does not indicate the start or the end of focus adjusting (no in step S1004), the processing proceeds to step S1005. On the other hand, if the camera control data indicates the start or the end of the focus adjusting (yes in step S1004), the processing proceeds to step S1009.

In step S1005, the IDR picture determination unit 103 determines whether the camera control data indicates the start or the end of zooming. If the camera control data does not indicate the start or the end of zooming (no in step S1005), the processing proceeds to step S1006. On the other hand, if the camera control data indicates the start or the end of the zooming (yes in step S1005), the processing proceeds to step S1009.

In step S1006, the IDR picture determination unit 103 determines whether the camera control data indicates the start or the end of panning/tilting. If the camera control data does not indicate the start or the end of panning/tilting (no in step S1006), the processing proceeds to step S1007. On the other hand, if the camera control data indicates the start or the end of panning/tilting (yes in step S1006), the processing proceeds to the step S1009.

In step S1007, the IDR picture determination unit 103 determines whether the camera control data indicates the start or the end of hand shaking. If the camera control data does not indicate the start or the end of hand shaking (no in step S1007), the processing proceeds to step S1008. On the other hand, if the camera control data indicates the start or the end of hand shaking (yes in step S1007), the processing proceeds to step S1009.

In step S1008, the IDR picture determination unit 103 determines whether the camera control data indicates the start or the end of special effect adding. If the camera control data does not indicate the start or the end of the special effect adding (no in step S1008), the processing proceeds to step S1010. On the other hand, if the camera control data indicates the start or the end of special effect adding (yes in step S1008), the processing proceeds to step S1009.

In step S1009, the IDR picture determination unit 103 outputs the IDR picture setting information to the coding unit 102, and then, the picture type determination unit 316 in the coding unit 102 sets the picture type as the IDR picture according to the IDR picture setting information. More specifically, the picture type of the picture immediately before the start of the above-described operations of (1) to (5) is set as the IDR picture, and the picture type of the picture after the end of that is set as the IDR picture. Processing then proceeds to step S1011.

In step S1010, the picture type determination unit 316 in the coding unit 102 determines and sets the picture type in keeping with H.264 coding method, without using the IDR picture. Then, the processing proceeds to the step S1011.

In step S1011, the coding unit 102 performs the coding process based on the set picture type and outputs the coded data.

In step S1012, it is determined whether the image pick-up operation is ended. If the image pick-up operation is not ended (no in step S1012), the processing returns to step S1002. On the other hand, if the image pick-up operation is ended (yes in step S1012), the processing then ends.

Thus, according to this embodiment, since the picture type of the picture before an image gets unstable and/or after an image gets stable is set as the IDR picture, for example, the reproduction can be started from the stable image at some midpoint of the image stream. Also, the editing for removing the unstable image can be performed easily. Additionally, since the in-focused image is prohibited from referring to the out-of-focused image, the precision of the inter-picture prediction and the encoding efficiency can be improved.

Second Exemplary Embodiment

Figure 13:
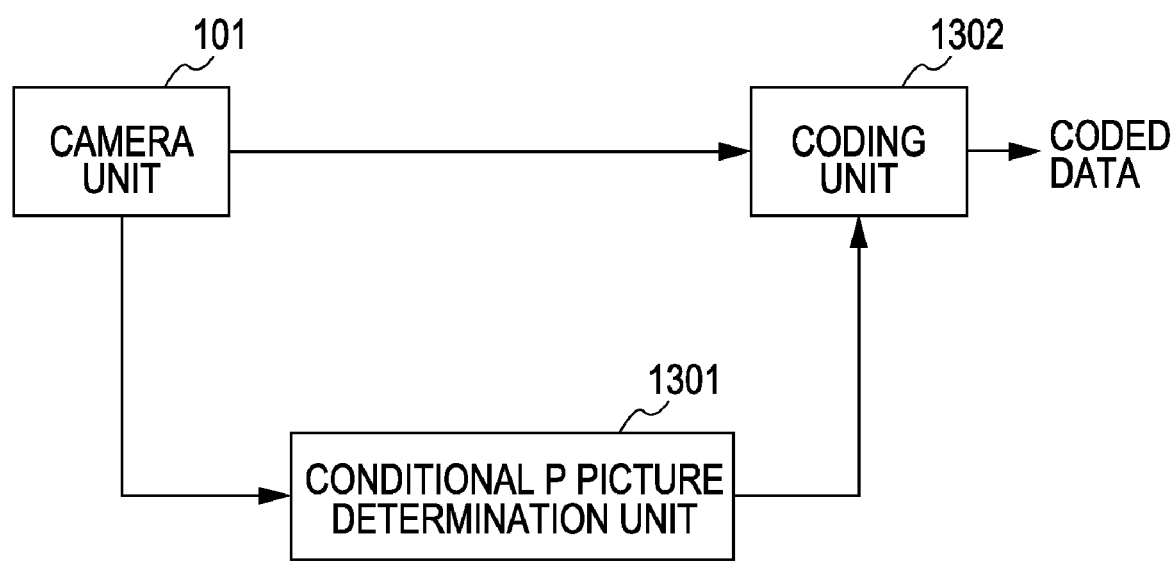
FIG. 13 is an exemplary block diagram illustrating an exemplary arrangement of an image processing apparatus in a second embodiment of the present invention.

FIG. 13 is an exemplary block diagram of the image processing apparatus in the second embodiment of the present invention. Components of the second embodiment (shown in FIG. 13) that have the same function as components of the first embodiment (shown in FIG. 1 and described above) have the same reference number, and descriptions thereof are not repeated here. The image processing apparatus in this embodiment can set a picture type as a conditional P picture (details are described later) which provides restrictions for other picture in motion reference relationship according to camera control data. The image processing apparatus in this embodiment includes a camera unit 101, a coding unit 1302 and a conditional P picture determination unit 1301.

In FIG. 13, the coding unit 1302 compression-codes the image data output from the camera unit 101. The conditional P picture determination unit 1301 determines whether the picture type is made into the conditional P picture according to the camera control data from the camera unit 101. The conditional P picture determination unit 1301 provides the determination result to the coding unit 1302.

Next, the coding unit 1302 and the conditional P picture determination unit 1301 are described below in detail.

An exemplary arrangement of the coding unit 1302 is described below with reference to FIG. 14.

Figure 14:
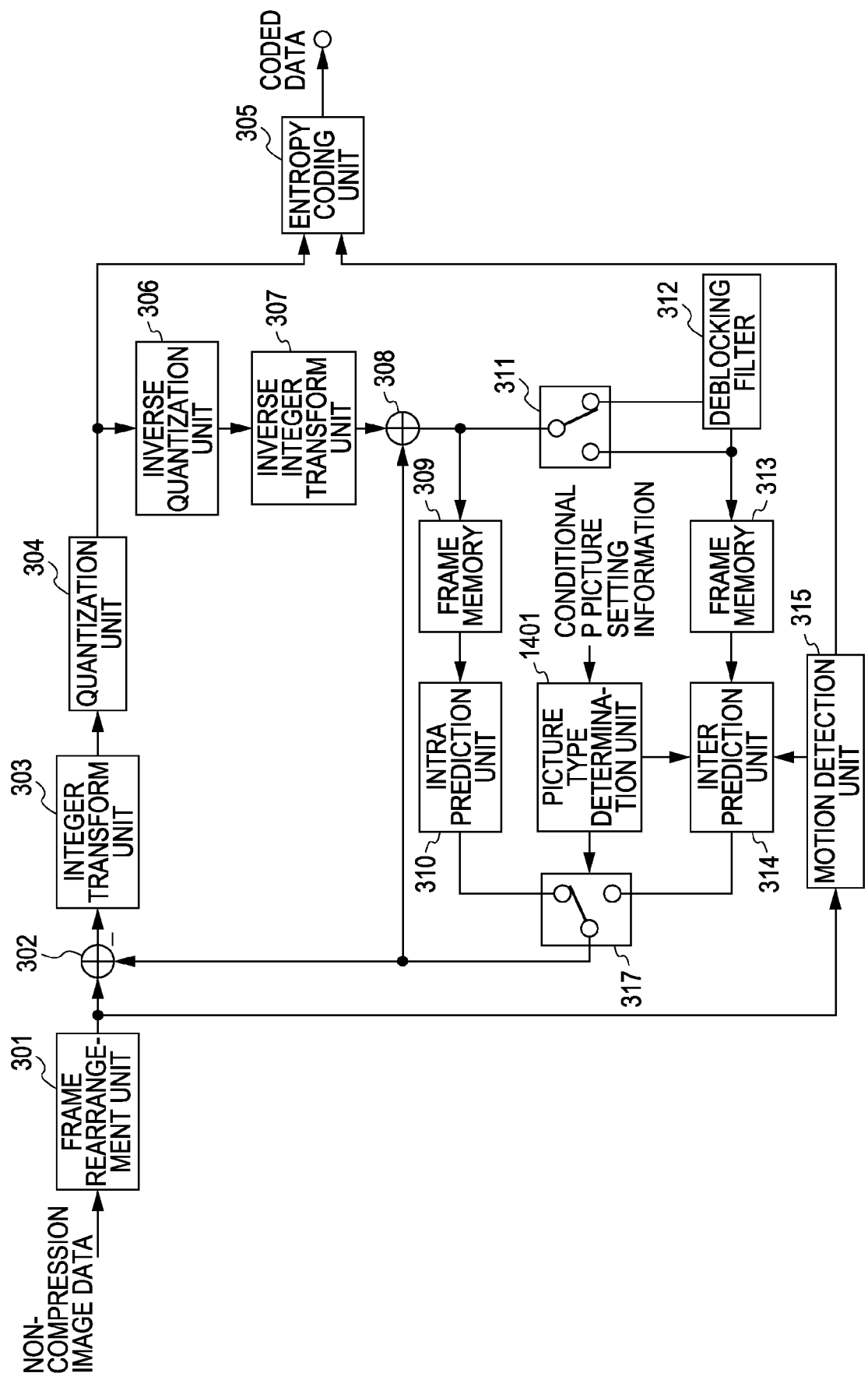
FIG. 14 is an exemplary block diagram illustrating an exemplary arrangement of a coding unit in a second embodiment of the present invention.

FIG. 14 is an exemplary block diagram illustrating an exemplary arrangement of the coding unit 1302. The coding unit 1302 generates block data by dividing the input non-compression image data, and encodes the input non-compression image data by the block unit to output coded data. Components of the second embodiment (shown in FIG. 14) that have the same function as components of the first embodiment (shown in FIG. 3 and described above) have the same reference number, and descriptions thereof are not repeated here.

In FIG. 14, in cases where the conditional P picture determination unit 1301 (described later) determines a picture of a coding object as the conditional P picture, the picture type determination unit 1401 determines the picture type of the picture of the coding object as the conditional P picture. On other hand, in cases where the conditional P picture determination unit 1301 does not determines the picture of the coding object as the conditional P picture, the picture type determination unit 1401 determines the picture type of the picture of the coding object in keeping with H.264 coding method, without using the conditional P picture. That is, the picture type of the coding frame is determined as the picture type (e.g., I picture, P picture, B picture) other than the conditional P picture.

The selection unit 317 selects which predicted image data is to be used between the intra prediction and the inter prediction, i.e., the selection unit 317 selects one of the output from the intra prediction unit 310, and the output from the inter prediction unit 314 according to the picture type determined by the picture type determination unit 1401. The selection unit 317 outputs the selected predicted image data to the subtractor 302 and to the adder 308.

Next, determination process of the conditional P picture determination unit 1301 is described below with reference to FIGS. 15 to 21.

Here, the conditional P picture is described below with reference to FIG. 15.

Figure 15:
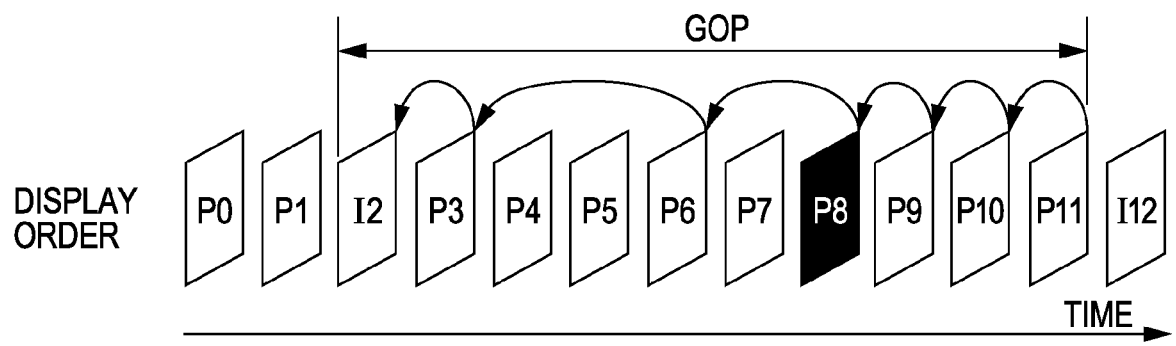
FIG. 15 illustrates a conditional P picture.

In FIG. 15, P8 picture is the conditional P picture. Other P pictures are the normal P pictures. In order to simplify explanation, this embodiment explains the random access to the conditional P picture by using the image sequence which comprises the I and the P pictures explained in this embodiment, but the random access to the conditional P picture is possible for the image sequence which comprises the I, the P, and the B pictures by the same method.

The conditional P picture is a picture which provides following restrictions for other pictures in the motion reference relationship:

(1) conditional P picture and other pictures which have reference relationship to the conditional P picture, refer only to the I or P picture in the same GOP (group of pictures);

(2) pictures other than the conditional P picture prohibit reference of the picture obtained by jumping over the conditional P picture.

The GOP is explained briefly here. The sequence of different frame types is called a Group of Pictures (GOP) structure. There are many possible structures but a common one is I5 frames long, and has the sequence I_BB_P_BB_P_BB_P_BB_P_BB_. The ratio of I, P and B pictures in the GOP structure is determined by the nature of the video stream and the bandwidth constraints on the output stream.

The restriction of the above (1) is described with reference to FIG. 15. The picture which the conditional P picture refers to is restricted to the I or the P picture in the same GOP according to the restriction of the above (1). In FIG. 15, for example, the conditional P8 picture cannot refer to P0 picture. In case of the example of FIG. 15, the conditional P8 picture refers to P6 picture in the same GOP. Additionally, the picture which the P6 picture refers to is also restricted to the I picture or the P picture in the same GOP. In case of the example of FIG. 15, the P6 picture refers to P3 picture in the same GOP. Additionally, the picture which the P3 picture refers to is also restricted to the I or the P picture in the same GOP. In case of the example of FIG. 15, the P3 picture refers to I2 picture in the same GOP. Therefore, the conditional P8 picture can be decoded only by decoding the I2 picture, the P3 picture and the P6 picture beforehand.

Next, the restriction of the above (2) is described with reference to FIG. 15. The pictures following the conditional P8 picture cannot refer to the picture preceding the conditional P8 picture according to the restriction of the above (2). For example, In FIG. 15, P9, P10 and P11 pictures cannot refer to P5 picture. In case of the example of FIG. 15, the P11 picture refers to the P10 picture, the P10 picture refers to the P9 picture, and the P9 picture refers to the conditional P8 picture. Therefore, in cases where the reproduction is started from the conditional P8 picture, the pictures following the conditional P8 picture can be decoded sequentially by using local decoded image data, which is obtained by decoding the conditional P8 picture or the picture following the conditional P8 picture, stored in the frame memory.

Thus, by the above-described restriction, the in case of the example of FIG. 15, the conditional P8 picture can be decoded by decoding beforehand only a total of three pictures of the I2, P3, and P6 pictures which have reference relation to the conditional P8 picture. In addition, the pictures following the conditional P8 picture can be decoded sequentially by using local decoded image data which is obtained by decoding the conditional P8 picture or the picture following the conditional P8 picture. Therefore, according to this embodiment, the random access reproduction from the conditional P picture can be performed by decoding a few pictures preceding the conditional P picture beforehand.

Next, a determination process of the conditional P picture determination unit 1301 is described below with reference to FIGS. 16 to 21.

FIGS. 16 to 21 illustrate an input image sequence, its picture type, and the camera control data. In each figure, the upper part illustrates each picture in the display order (displaying sequentially from a left frame), and the lower part illustrates each picture in the coding order (encoding sequentially from a left frame).

Figure 16:
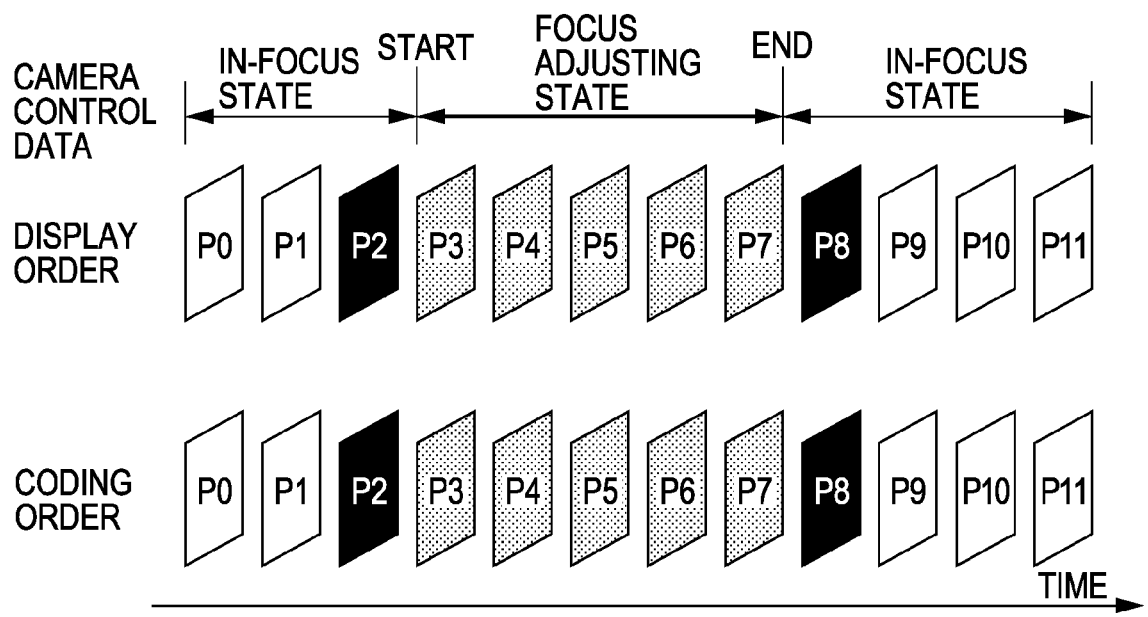
FIGS. 16 and 17 illustrate an exemplary setting process of a conditional P picture according to camera control data which indicates a focus adjusting control state.

For example, in FIG. 16, P10 picture indicates the P picture displayed eleventh. The camera control data illustrated in FIGS. 16 and 17 indicates focus adjusting control data.

In the display order of FIG. 16, the camera unit 101 is in an in-focus state between P0 picture and conditional P2 picture, and between conditional P8 picture and P11 picture, and outputs sharply focused image data. Since the camera unit 101 started the focus adjusting process at the time of P3 picture and ended the focus adjustment process at the time of P7 picture, the camera unit 101 is in a focus adjusting state (an out-of-focus state) between the P3 picture and the P7 picture, and outputs out-of-focused image data.

Figure 17:
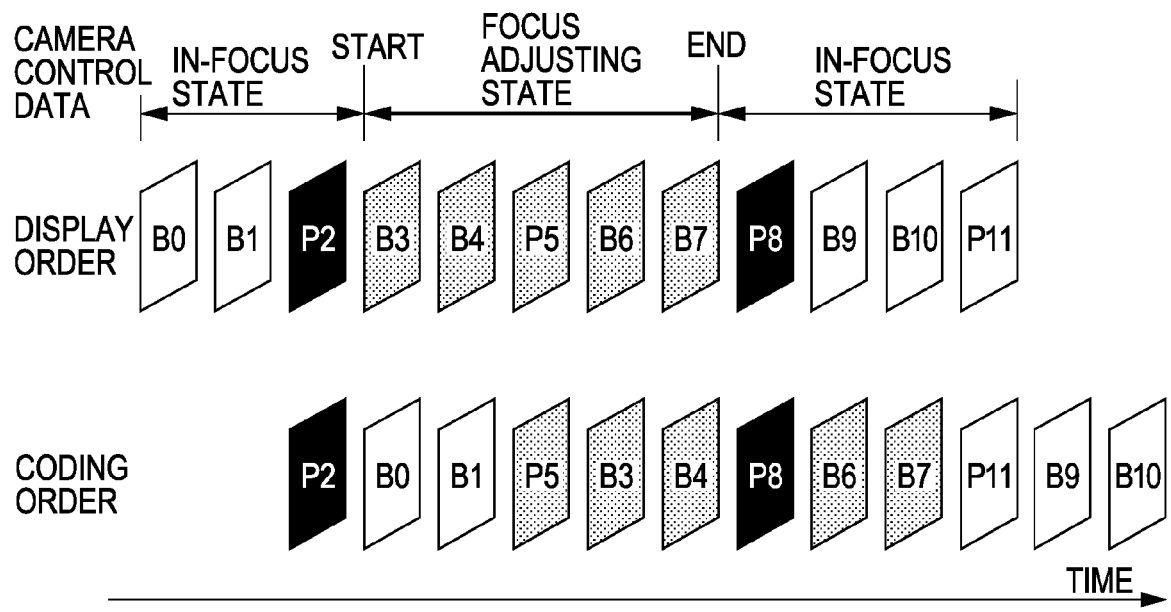

In the display order of FIG. 17, the camera unit 101 is in an in-focus state between B0 picture and conditional P2 picture, and between conditional P8 picture and P11 picture, and outputs sharply focused image data. Since the camera unit 101 started the focus adjusting process at the time of P3 picture and ended the focus adjusting process at the time of P7 picture, the camera unit 101 is in an out-of-focus state (focus adjusting state) between the P3 picture and the P7 picture, and outputs out-of-focused image data.

The conditional P picture determination unit 1301 inputs the camera control data output from the camera unit 101, and analyzes the operation of the camera unit 101. Then, the picture type of each frame before a start of operation of the following (1) to (5) and/or after an end of that is determined as the conditional P picture, and the conditional P picture setting information is output to the coding unit 1302:

(1) focus adjusting;
(2) zooming;
(3) panning/tilting;
(4) hand shaking (vibration);
(5) special effect adding.

That is, the camera control data includes focus control data, zooming control data, vibration detection data which indicates a vibration of the camera unit, movement detection data which indicates having detected a movement (e.g., panning, tilting etc.) of the camera unit, and special effect adding data which indicates having added a special effect to the image data.

Here, in the case of (1), operation which determines the picture type as the conditional P picture according to the camera control data is described below with reference to FIG. 16 and FIG. 17. In the image sequence which does not include the B picture as shown in FIG. 16, the camera unit 101 is performing the focus adjusting process between the P3 picture and the P7 picture. Therefore, the conditional P picture determination unit 1301 determines, as the conditional P picture (P2 picture in FIG. 16), the picture type of the picture immediately before the start of the focus adjusting. Also, the conditional P picture determination unit 1301 determines, as the conditional P picture (P8 picture in FIG. 16), the picture type of the picture immediately after the end of the focus adjusting. In the image sequence which includes the B picture, which can be encoded using difference with a backward picture, as shown in FIG. 17, the camera unit 101 is performing the focus adjusting process between the B3 picture and the B7 picture. Therefore, the conditional P picture determination unit 1301 determines, as the conditional P picture (P2 picture in FIG. 17), the picture type of the picture immediately before the start of the focus adjusting operation. Also, the conditional P picture determination unit 1301 determines, as the conditional P picture (P8 picture in FIG. 17), the picture type of the picture immediately after the end of the focus adjusting operation.

In cases where the IDR picture is set as shown in FIGS. 16 and 17, for example, the reproduction can be started from the conditional P picture (P8 picture in FIGS. 16 and 17) immediately after in-focusing. Since the reference image is blurring even if the in-focused image (e.g., P10 picture in FIG. 16, B9 picture in FIG. 17) refers to the out-of-focused image (e.g., P5 picture in FIGS. 16 and 17), there is a lack of precision of the inter-frame prediction. Therefore, by setting the frame before and after the focus adjusting process as the conditional P picture, the in-focused image except the conditional P picture is prohibited from referring to the out-of-focused image. That is, since the in-focused image except the conditional P picture uses only another in-focused image as the reference image, the precision of the inter-picture prediction and coding efficiency can be improved.

Figure 18:
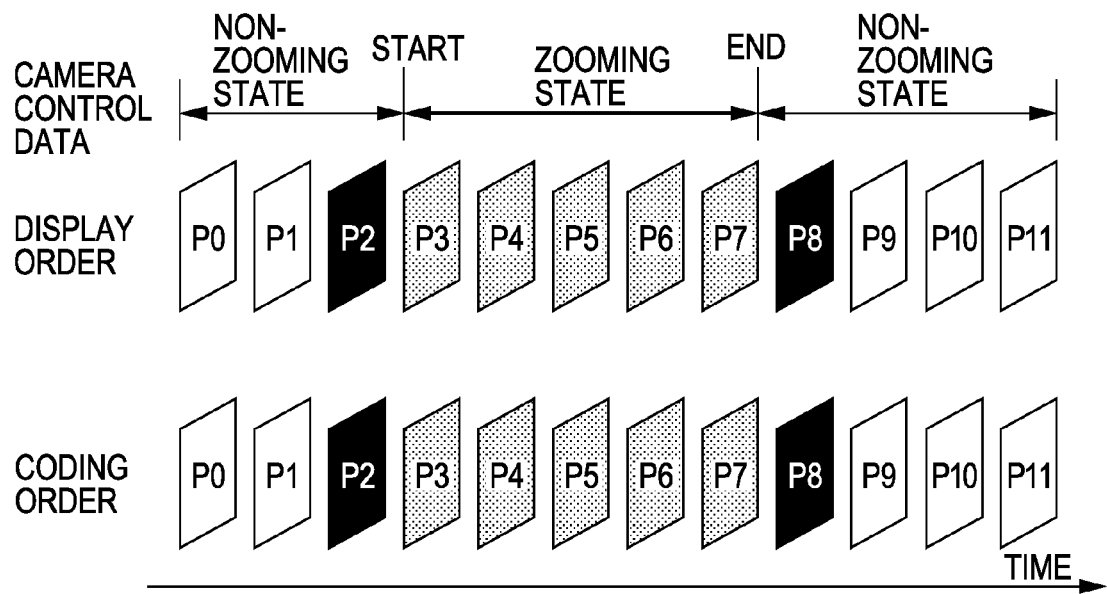
FIG. 18 illustrates an exemplary setting process of a conditional P picture according to camera control data which indicates a zooming state.
Figure 19:
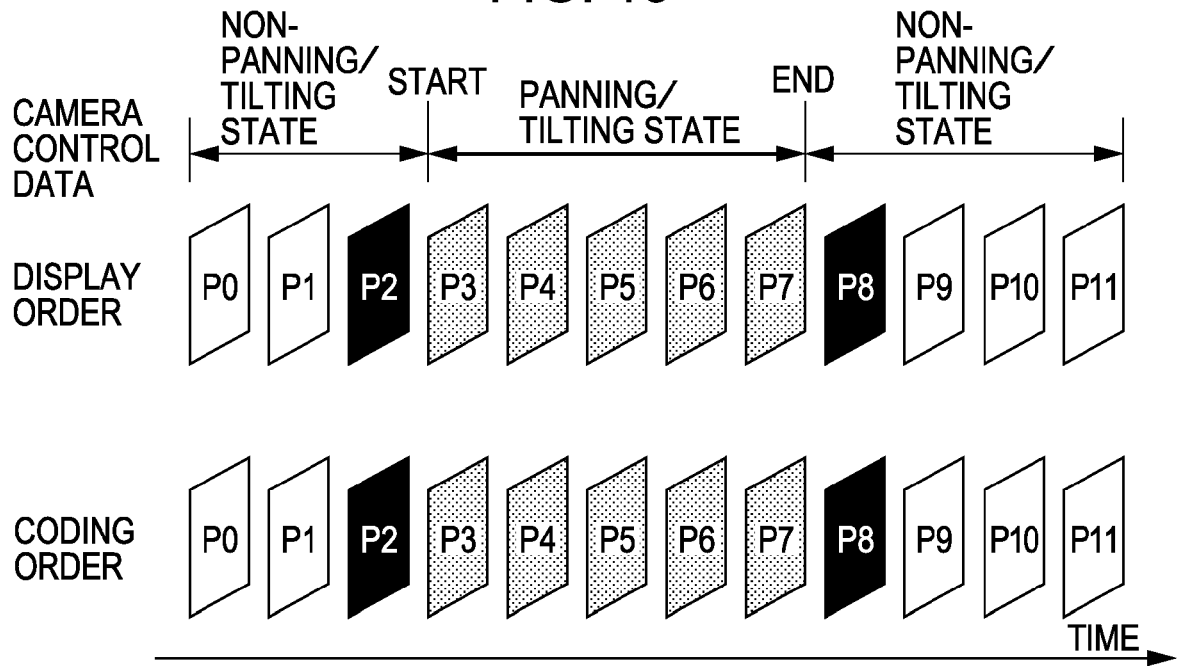
FIG. 19 illustrates an exemplary setting process of a conditional P picture according to camera control data which indicates a panning/tilting state.
Figure 20:
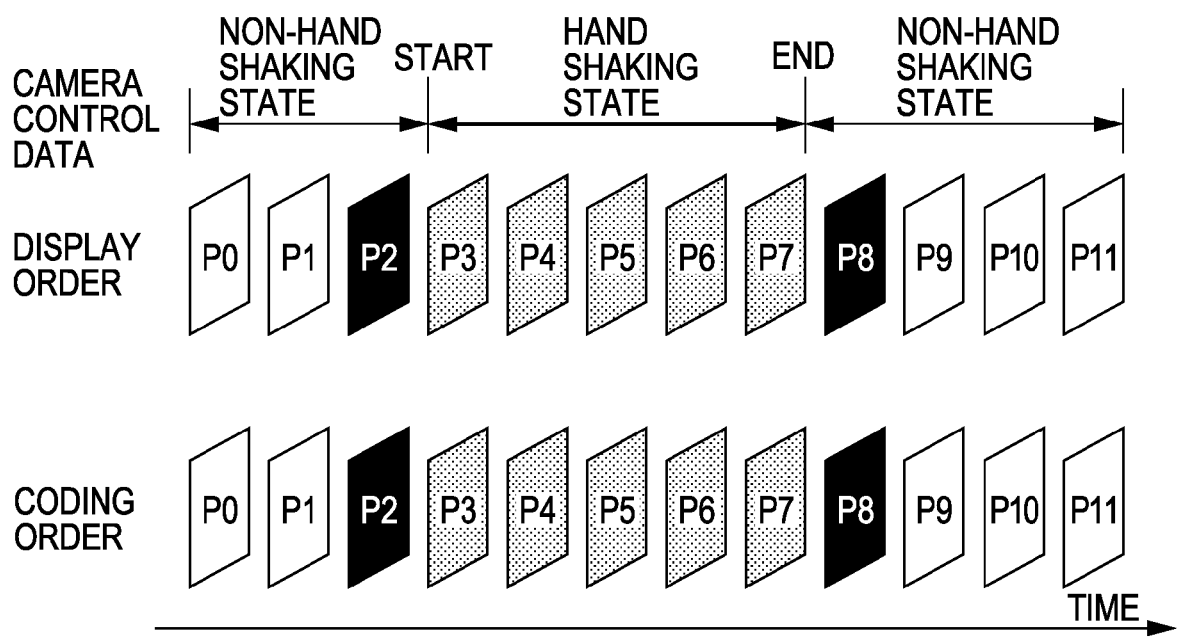
FIG. 20 illustrates an exemplary setting process of a conditional P picture according to camera control data which indicates a hand shaking state.
Figure 21:
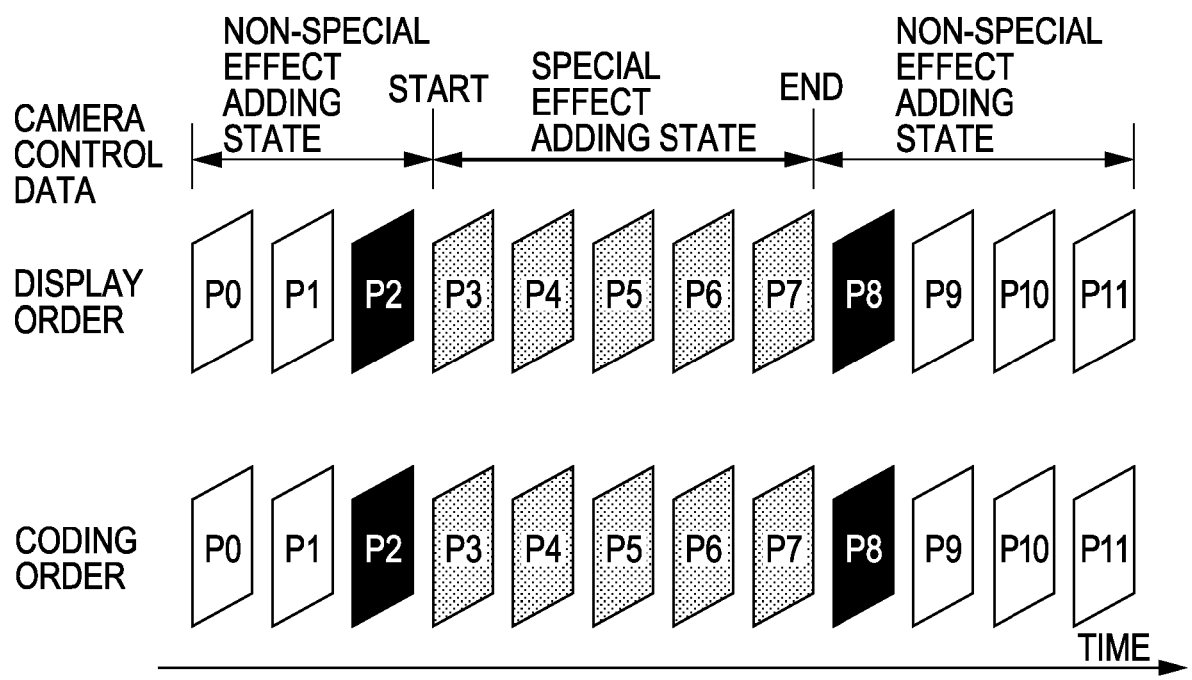
FIG. 21 illustrates an exemplary setting process of a conditional P picture according to camera control data which indicates a special effect adding state.

In the case of (2) zooming as well as the case of the above-described (1) focus adjusting, as shown in FIG. 18, the picture type of the pictures before a start of the zooming and after an end of zooming is set as the conditional P picture. In the case of (3) panning/tilting, as shown in FIG. 19, the picture type of the pictures before a start of the panning/tilting and after an end of the panning/tilting is set as the conditional P picture. In the case of (4) hand shaking, as shown in FIG. 20, the picture type of the pictures before a start of the hand shaking and after an end of the hand shaking is set as the conditional P picture. In the case of (5) special effect adding, as shown in FIG. 21, the picture type of the pictures before a start of the special effect adding and after an end of the special effect adding is set as the conditional P picture.

In cases where the zooming speed or panning/tilting speed is slower than a predetermined threshold, since a user may be carrying out slow operation intentionally, the picture type of the picture before the start of the zooming, panning/tilting operation and/or after the end of that may be made not to be determined as the conditional P picture.

Figure 22:
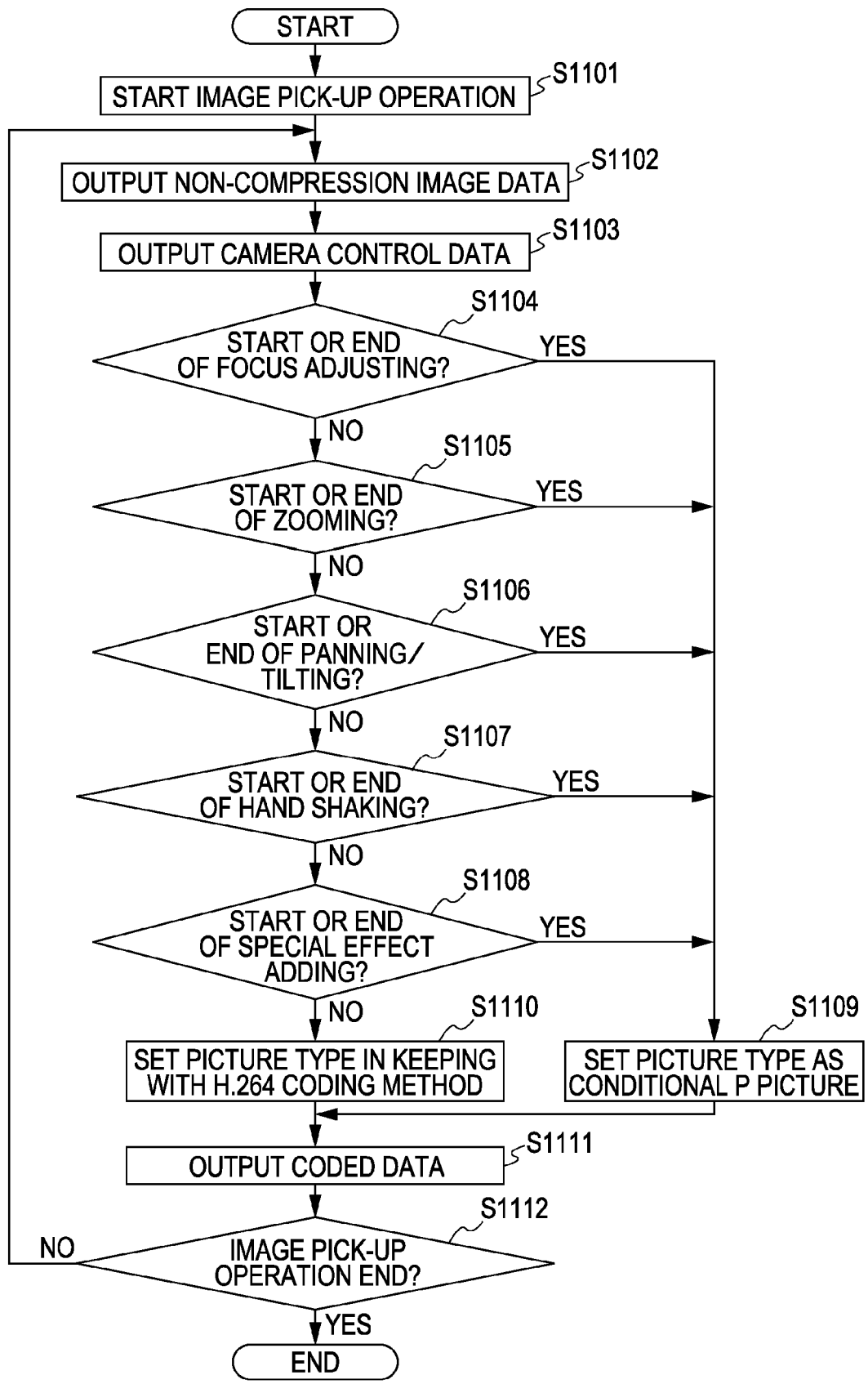
FIG. 22 is a flowchart illustrating exemplary setting process procedures of a conditional P picture in a second embodiment.

Next, the process which sets the conditional P picture according to the above-described camera control data is described with reference to the flowchart illustrated in FIG. 22.

First, in step S1101, image pick-up operation is started in the camera unit 101. Next, in step S1102, the camera unit 101 outputs the non-compression image data to the coding unit 1302. In step S1303, the camera unit 101 outputs the camera control data to the conditional P picture determination unit 1301.

Next, in step 1104, the conditional P picture determination unit 1301 determines whether the camera control data indicates the start or the end of focus adjusting. If the camera control data does not indicate the start or the end of focus adjusting (no in step S1104), the processing proceeds to step S1105. On the other hand, if the camera control data indicates the start or the end of focus adjusting (yes in step S1104), the processing proceeds to step S1109.

In step S1105, the conditional P picture determination unit 1301 determines whether the camera control data indicates the start or the end of zooming. If the camera control data does not indicate the start or the end of zooming (no in step S1105), the processing proceeds to step S1106. On the other hand, if the camera control data indicates the start or the end of zooming (yes in step S1105), the processing proceeds to step S1109.

In step S1106, the conditional P picture determination unit 1301 determines whether the camera control data indicates the start or the end of panning/tilting. If the camera control data does not indicate the start or the end of panning/tilting (no in step S1106), the processing proceeds to step S1107. On the other hand, if the camera control data indicates the start or the end of panning/tilting (yes in step S1106), the processing proceeds to step S1109.

In step S1107, the conditional P determination unit 1301 determines whether the camera control data indicates the start or the end of hand shaking. If the camera control data does not indicate the start or the end of hand shaking (no in step S1107), the processing proceeds to step S1108. On the other hand, if the camera control data indicates the start or the end of hand shaking (yes in step S1107), the processing proceeds to step S1109.

In step S1108, the conditional P picture determination unit 1301 determines whether the camera control data indicates the start or the end of special effect adding. If the camera control data does not indicate the start or the end of special effect adding (no in step S1108), the processing proceeds to step S1110. On the other hand, if the camera control data indicates the start or the end of special effect adding (yes in step S1108), the processing proceeds to step S1109.

In step S1109, the conditional P picture determination unit 1301 outputs the conditional P picture setting information to the coding unit 1302, and then, the picture type determination unit 1401 in the coding unit 1302 sets the picture type as the conditional P picture according to the conditional P picture setting information. More specifically, the picture type of the picture immediately before the start of the above-described operations of (1) to (5) is set as the conditional P picture, and the picture type of the picture immediately after the end of that is set as the conditional P picture. Processing then proceeds to step S1111.

In step S1110, the picture type determination unit 1401 in the coding unit 1302 determines and sets the picture type in keeping with H.264 coding method, without using the conditional P picture. Then, the processing proceeds to the step S1111.

In step S1111, the coding unit 1302 performs the coding process based on the set picture type and outputs the coded data.

In step S1112, it is determined whether the image pick-up operation is ended. If the image pick-up operation is not ended (no in step S1112), the processing returns to step S1102. On the other hand, if the image pick-up operation is ended (yes in step S1112), the processing then ends.

Thus, according to this embodiment, by setting the conditional P picture according to the camera control data, the random access reproduction can be performed. In addition, by using the conditional P picture by which the inter-picture prediction coding is performed, encoding efficiency can be improved.

Third Exemplary Embodiment

Figure 23:
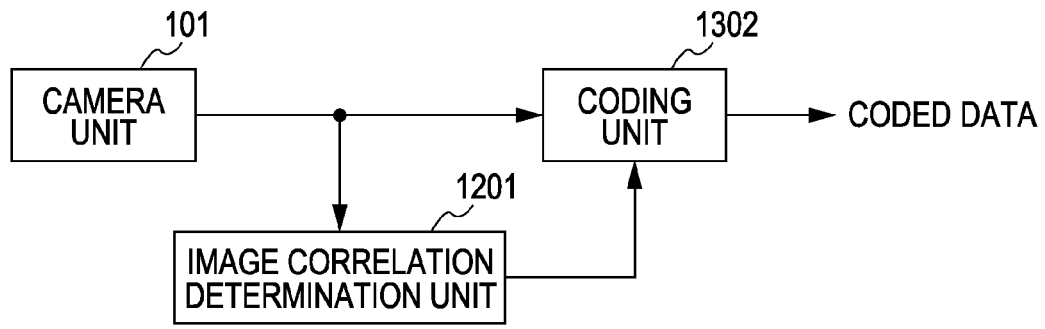
FIG. 23 is an exemplary block diagram illustrating an exemplary arrangement of an image processing apparatus in a third embodiment of the present invention.

FIG. 23 is an exemplary block diagram of the image processing apparatus in the third embodiment of the present invention. Components of the third embodiment (shown in FIG. 23) that have the same function as components of the second embodiments (shown in FIG. 13 described above) have the same reference number, and descriptions thereof are not repeated here. The image processing apparatus in this embodiment can set a picture type as the conditional P picture (described in the second embodiment) which provides restrictions for other pictures in motion reference relationships according to a correlation between the pictures. The image processing apparatus in this embodiment includes the camera unit 101, the coding unit 1302 and an image correlation determination unit 1201.

In FIG. 23, the image correlation determination unit 1201 evaluates a difference value between pictures. Then, the image correlation determination unit 1201 determines that there is a correlation between the pictures if the difference value is smaller than a predetermined threshold. Otherwise (if the difference value is not smaller than the predetermined threshold), the image correlation determination unit 1201 determines that there is no correlation between the pictures. In cases where it is determined that there is no correlation among the plurality of pictures, the image correlation determination unit 1201 outputs the conditional P picture setting information to the coding unit 1302.

In cases where the conditional P picture setting information is output from the image correlation determination unit 1201, the picture type determination unit 1401 in the coding unit 1302 sets the picture type as the conditional P picture as in the above-described second embodiment. On other hand, in cases where the image correlation determination unit 1201 determines that there is a correlation between frames of the image, the image correlation determination unit 1201 does not output the conditional P picture setting information, and the picture type determination unit 1401 determines and sets the picture type in keeping with the H.264 coding method.

In the continuous image sequence, the scene with a scene change, the scene with a firing of a flash, etc., are examples of a scene determined as there not being a correlation between the pictures. The setting process of the conditional P picture in the above-described two examples is described below with reference to FIGS. 24 and 25.

Figure 24:
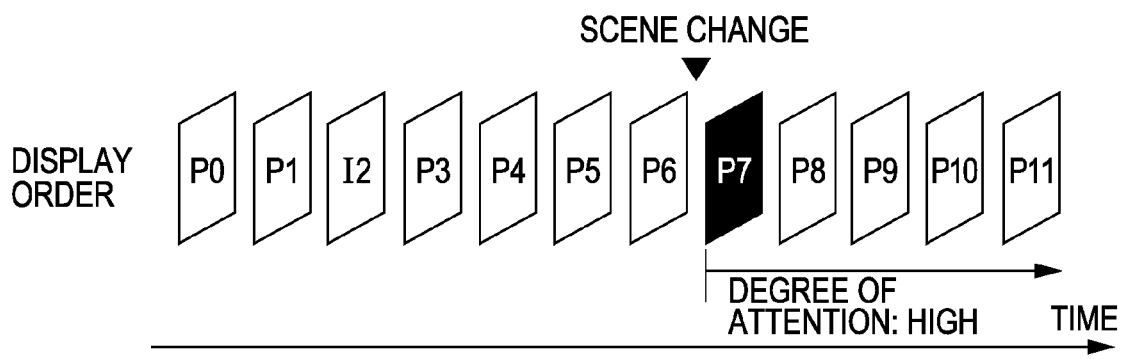
FIG. 24 illustrates an exemplary setting process of a conditional P picture according to a scene change operation.
Figure 25:
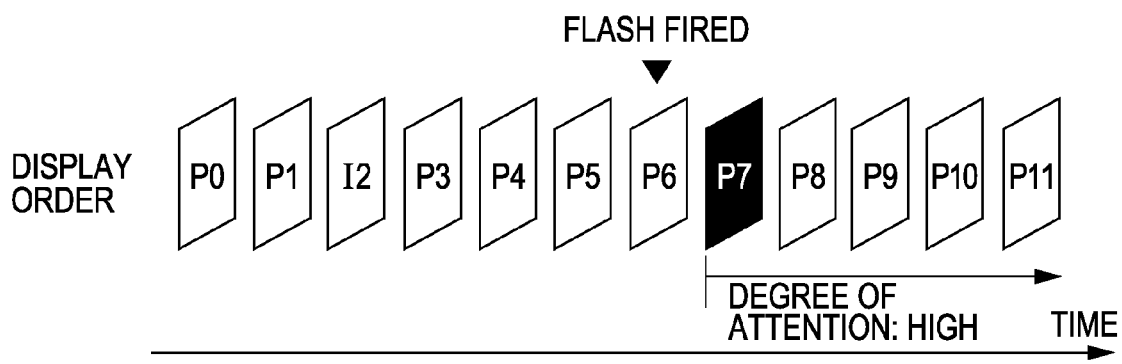
FIG. 25 illustrates an exemplary setting process of a conditional P picture according to a flash photographing operation.

FIG. 24 illustrates an image sequence in which the scene change is generated immediately after P6 picture. FIG. 25 illustrates an image sequence in which the firing of the flash photographing is carried out at the time of P6 picture. In order to simplify explanation, this embodiment explains the random access to the conditional P picture by using the image sequence which comprises the I and the P pictures is explained in this embodiment, but the random access to the conditional P picture is possible for the image sequence which comprises the I, the P, and the B pictures by the same method.

In the scene change, since the difference between the image before the scene change and the image after the scene change is large, the degree of attention of a viewer at the time of the image reproduction is heightened. The firing of the flash is used in the time of the still image photographing etc. in a dark place. In cases where the still picture photographing is carried out simultaneously with the moving picture photographing, the firing of the flash may be performed in synchronization with the still picture photographing. Since the still image photographing means that an object with the high degree of attention exists, the moving picture when performing the firing of the flash has the high degree of attention. It is better to set the random access point in an image sequence portion with the high degree of attention, since the viewer desires for the random access from the image sequence with the high degree of attention.

Accordingly, in this embodiment, at least one of pictures after the scene change or the firing of the flash (the still picture photographing) is set as the conditional P picture, and the random access point is set. That is, when the image correlation determination unit 1201 determines that there is no correlation between the pictures, the picture type determination unit 1401 sets, as the conditional P picture, at least one of pictures after the scene change or the firing of the flash.

In FIG. 24, since the scene change is generated immediately after P6 picture, the picture (P7 picture in FIG. 24) immediately after the P6 picture is set as the conditional P picture. In FIG. 25, since the firing of the flash is carried out at the time of P6 picture, the picture (P7 picture in FIG. 25) immediately after the P6 picture is set as the conditional P picture.

Although only one picture (P7 after the scene change or the firing of the flash) is set as the conditional P picture in FIGS. 24 and 25, a plurality of pictures (for example, P7, P8, and P9 pictures in FIGS. 24 and 25) may be set as conditional P picture.

Next, the process which sets the conditional P picture according to the above-described scene change or the firing of the flash is described with reference to the flowchart illustrated in FIG. 26. Steps of the third embodiment (shown in FIG. 26) that have the same process as steps of the second embodiments (shown in FIG. 22 and described above) have the same number, and descriptions thereof are not repeated here.

Figure 26:
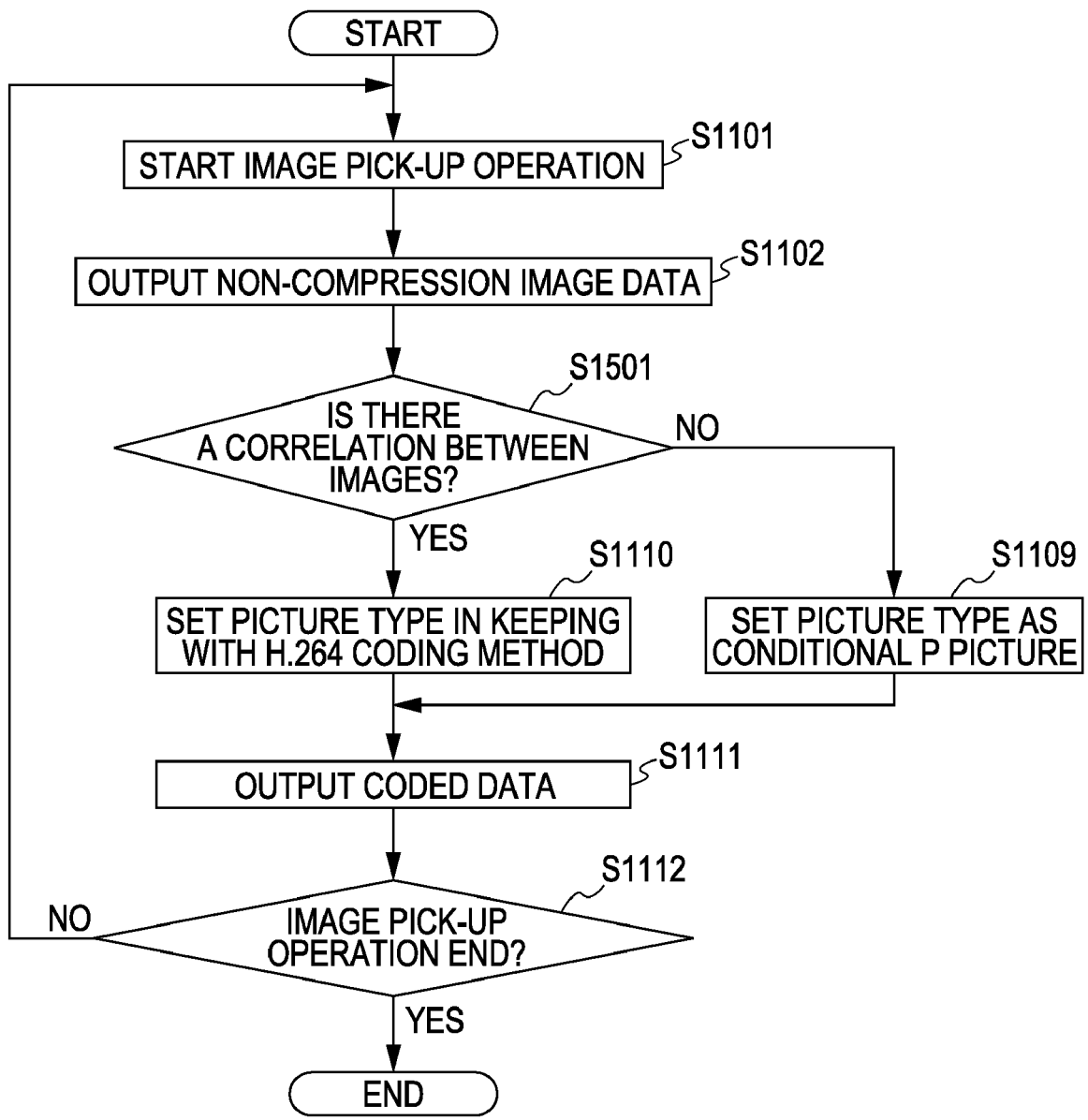
FIG. 26 is a flowchart illustrating exemplary setting process procedures of a conditional P picture in a third embodiment.

In FIG. 26, in step S1501, the image correlation determination unit 1201 determines the correlation of the image by the difference value between the pictures of the non-compression image data output by the camera unit 101.

If there is not a correlation of the image (no in step S1501), the processing proceeds to step S1109. On the other hand, if there is a correlation of the image (yes in step S1501), the processing proceeds to step S1110.

Thus, according to this embodiment, by setting the conditional P picture according to the scene change or the firing of the flash, the random access reproduction can be performed easily. In addition, by using the conditional P picture by which the inter-picture prediction coding is performed, the encoding efficiency can be improved.

Other Embodiments

The present invention can be applied to an apparatus consisting of a single device or to a system including a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

In this case, the program may be executed in any form, such as object code, a program executed by an interpreter, or script data supplied to an operating system (OS).

Example of storage media that can be used for supplying the program include a floppy disk, a hard disk, an optical disk, a magneto-optical disk, a CD-ROM (compact disk-read-only memory), a CD-R (CD-recordable), a CD-RW (CD-rewritable), a magnetic tape, a non-volatile type memory card, a ROM, a DVD (digital versatile disk, e.g., a DVD-ROM and a DVD-R), and a Blu-ray Disc.

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information to install the program in the user computer.

Besides the cases where the aforementioned functions according to the embodiments are implemented by executing the read program by computer and an operating system or the like running on the computer may perform all or a part of the actual processing so that the functions of the foregoing embodiments can be implemented by this processing.

After the program is read from the storage medium it can be written to a function expansion board inserted into the computer or to a memory provided in a function expansion unit connected to the computer. A central processing unit (CPU) or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims the benefit of Japanese Patent Application No. 2005-161847, filed Jun. 1, 2005, and Japanese Patent Application No. 2005-351054, filed Dec. 5, 2005, which are hereby incorporated by reference in their entirety herein.

What is claimed is:

1. An image coding apparatus for performing a coding process by using inter-picture prediction, the image coding apparatus comprising:
 a camera unit arranged to pick-up an object image and to output image data;
 a determination unit arranged to determine whether random access for a picture is possible based on operation information of the camera unit; and
 a coding unit arranged to encode the image data output by the camera unit into coded data, the image data being encoded so that random access is possible when the determination unit determines that random access is possible for the picture.

2. An image coding apparatus for performing a coding process by using inter-picture prediction, the image coding apparatus comprising:
 a determination unit arranged to obtain camera control data relating to operation of a camera unit which picks up an object image, and to determine whether reference of a picture from the object image obtained by jumping over a predetermined picture is prohibited based on the camera control data; and a coding unit arranged to encode object image data input from the camera unit, the object image data being encoded prohibiting reference of the picture obtained by jumping over the predetermined picture when the determination unit determines that reference of the picture obtained by jumping over the predetermined picture is prohibited.

3. An image coding apparatus according to claim 2, wherein the coding unit is arranged to encode the predetermined picture as an instantaneous decoder refresh picture.

4. An image coding apparatus according to claim 2, wherein the camera control data includes at least one of focus control data, zooming control data, vibration detection data which indicates a vibration of the camera unit, movement detection data which indicates having detected a movement of the camera unit, and special effect adding data which indicates having added a special effect to the image data.

5. An image coding apparatus according to claim 2, wherein the determination unit is arranged to determine whether reference of a picture from the object image obtained by jumping over a predetermined picture is prohibited based on whether operation of the camera unit matches a prohibition condition which prohibits reference of the picture obtained by jumping over the predetermined picture.

6. An image coding apparatus according to claim 5, wherein the predetermined picture is generated before a first picture beginning a group of continuous pictures comprising at least one picture within a period determined that the operation of the camera unit matches the prohibition condition.

7. An image coding apparatus according to claim 5, wherein the predetermined picture is generated after a last picture of a group of continuous pictures comprising at least one picture within a period determined that the operation of the camera unit matches the prohibition condition.

8. An image coding apparatus according to claim 5, wherein the predetermined picture is generated before a first picture or after a last picture of a group of continuous pictures comprising at least one picture within a period determined that the operation of the camera unit matches the prohibition condition.

9. An image coding apparatus according to claim 5, wherein the operation of the camera unit which matches the prohibition condition includes at least one of a start or an end of focus adjusting, a start or an end of zooming, a start or an end of vibration detection of the camera unit, a start or end of movement of the camera unit, and a start or an end of special effect adding.

10. An image coding method for performing a coding process by using inter-picture prediction and a processor, the image coding method comprising:
  picking-up an object image via a camera unit;
  obtaining image data based on the object image picked-up;
  determining whether random access to a picture is possible based on control information obtained from the camera unit; and
  encoding, using the processor, the image data to generate coded data such that the encoded data includes a picture in which random access is possible when it is determined that random access is possible based on the control information obtained from the camera unit.

11. A non-transitory computer-readable storage medium storing a computer program for causing a computer to execute the image coding method according to claim 10.

12. An image coding method for performing a coding process by using inter-picture prediction and a processor, the image coding method comprising:
  obtaining image data from a camera unit;
  obtaining camera control data relating to operation of the camera unit;
  determining whether reference of a picture obtained by jumping over a predetermined picture is prohibited based on the camera control data;
  encoding, using the processor, the image data obtained from the camera unit the image data being encoded prohibiting reference of the picture obtained by jumping over the predetermined picture when the it is determined that reference of the picture obtained by jumping over the predetermined picture is prohibited.

13. A non-transitory computer-readable storage medium storing a computer program for causing a computer to execute the image coding method according to claim 12.

14. An image coding apparatus comprising:
  a camera unit arranged to pick-up an object image and to output image data; and
  a coding unit arranged to encode the image data output by the camera unit, by using intra-picture coding or inter-picture coding;
  wherein the coding unit encodes a predetermined picture of the image data output by the camera unit by using intra-picture coding in accordance with an operation of the camera unit during an encoding process of the image data by the coding unit, and relates information to prohibit a picture which is displayed before the predetermined picture to be used as a referring picture with the predetermined picture which is encoded by using intra-picture coding, so as to encode a picture which is displayed after the predetermined picture by using inter-picture coding.

15. An image coding apparatus according to claim 14, wherein the coding unit can use a picture which is displayed further before the picture to be encoded as a referring picture by using the intra-picture coding which is displayed before the picture to be encoded by using the inter-picture coding, so as to encode the picture by using the inter-picture coding.

16. An image coding apparatus according to claim 14, wherein the coding unit encodes the predetermined picture as an instantaneous decoder refresh picture.

17. An image coding apparatus according to claim 14, wherein the coding unit receives camera control data from the camera unit.

18. An image coding apparatus according to claim 17, wherein the camera control data includes at least one of focus control data, zooming control data, vibration detection data which indicates a vibration of the camera unit, movement detection data which indicates having detected a movement of the camera unit, and special effect adding data which indicates having added a special effect to the image data.

19. An image coding apparatus according to claim 14, wherein the coding unit encodes the picture corresponding to a start of an operation by using the intra-picture coding in accordance with an operation of the camera unit during the encoding process of the image data, and relates the information to prohibit the picture which is displayed before the picture corresponding to a start of the operation to be used as a referring picture, with the picture corresponding to the start of the operation which is encoded by using intra-picture coding, so as to encode the picture displayed after the picture corresponding to the start of the operation by using the inter-picture coding.

20. An image coding apparatus according to claim 14, wherein the coding unit encodes the picture corresponding to an end of the operation by using the intra-picture coding in accordance with the operation of the camera unit during the encoding process of the image data, and relates the information to prohibit the picture which is displayed before the picture corresponding to an end of the operation to be used as a referring picture, with the picture corresponding to the end of the operation which is encoded by using intra-picture coding, so as to encode the picture displayed after the picture corresponding to the end of the operation by using the inter-picture coding.

21. An image coding apparatus according to claim 14, wherein the coding unit encodes the picture corresponding to a start and an end of the operation by using the intra-picture coding in accordance with the operation of the camera unit during the encoding process of the image data by the encoding unit, and relates the information to prohibit the picture which is displayed before the picture corresponding to the start and the end of the operation to be used as a referring picture, with the picture corresponding to the start and the end of the operation which is encoded by using intra-picture coding, so as to encode the picture displayed after the picture corresponding to the start and the end of the operation by using the inter-picture coding.

22. An image coding method comprising:

picking-up an object image via a camera unit;

obtaining image data based on the object image picked-up;

encoding the image data, by using intra-picture coding or inter-picture coding; and encoding, using a processor, a predetermined picture of image data output from the camera by using intra-picture coding in accordance with an operation of the camera unit during an encoding process of the image data, and relating information to prohibit a picture which is displayed before the predetermined picture to be used as a referring picture, with the predetermined picture encoded by using intra-picture coding, so as to encode the picture displayed after the predetermined picture by using the inter-picture coding.

\* \* \* \* \*